US012500798B2

(12) United States Patent
Wu et al.

(10) Patent No.: US 12,500,798 B2
(45) Date of Patent: Dec. 16, 2025

(54) COMMUNICATION APPARATUS FOR SIGNAL TRANSMISSION AND SIGNAL TRANSMISSION METHOD

(71) Applicant: HUAWEI TECHNOLOGIES CO., LTD., Guangdong (CN)

(72) Inventors: Tao Wu, Shenzhen (CN); Xiaoyue Hou, Shenzhen (CN)

(73) Assignee: Huawei Technologies Co., LTD., Shenzhen (CN)

(*) Notice: Subject to any disclaimer, the term of this patent is extended or adjusted under 35 U.S.C. 154(b) by 130 days.

(21) Appl. No.: 18/066,985

(22) Filed: Dec. 15, 2022

(65) Prior Publication Data
US 2023/0119907 A1 Apr. 20, 2023

Related U.S. Application Data

(63) Continuation of application No. PCT/CN2021/098488, filed on Jun. 5, 2021.

(30) Foreign Application Priority Data

Jun. 16, 2020 (CN) .......................... 202010550902.8

(51) Int. Cl.
H04L 27/04 (2006.01)
H04L 27/06 (2006.01)
(Continued)

(52) U.S. Cl.
CPC ............. H04L 27/04 (2013.01); H04L 27/06 (2013.01); H04W 72/1268 (2013.01); H04B 5/20 (2024.01); H04B 5/45 (2024.01)

(58) Field of Classification Search
CPC ......... H04L 27/04; H04L 27/06; H04L 25/20; H04W 72/1268; H04B 5/77; H04B 7/14; G01S 13/751; H03H 9/14555
See application file for complete search history.

(56) References Cited

U.S. PATENT DOCUMENTS 10,073,993 B2 * 9/2018 Recouly .................. H04B 5/48
10,873,363 B2 * 12/2020 Gollakota ............. H04B 1/713
(Continued)

FOREIGN PATENT DOCUMENTS

WO WO-2019158196 A1 * 8/2019 ............. G01S 13/75

OTHER PUBLICATIONS

Azim et al "A collision avoidance methodology for chipless RFID tags", 2011, pp. 1514-11517, Proceedings of the Asia-Pacific Microwave Conference 2011. (Year: 2011).*
(Continued)

Primary Examiner — Sophia Vlahos
(74) Attorney, Agent, or Firm — Fish & Richardson P.C.

(57) ABSTRACT

This application provides communication apparatuses and methods for signal transmission and reception, applied to, for example, backscatter communications. In an example method, a tag device receives a downlink excitation signal, where the downlink excitation signal is a linear frequency modulated signal or a multi-carrier linear frequency modulated signal. The tag device generates an uplink reflection signal according to the downlink excitation signal and uplink information. The tag device sends the uplink reflection signal to a network device. When receiving the uplink reflection signal from the tag device and receiving the downlink excitation signal, the network device performs fractional Fourier transform on the uplink reflection signal and the downlink excitation signal, to obtain an uplink frequency domain reflection signal and a downlink frequency domain excitation signal. The uplink frequency domain reflection signal and the downlink frequency domain excitation signal do not overlap each other.

20 Claims, 11 Drawing Sheets

(51) Int. Cl.
*H04W 72/1268* (2023.01)
*H04B 5/20* (2024.01)
*H04B 5/45* (2024.01)

(56) References Cited

U.S. PATENT DOCUMENTS

2008/0252422 A1* 10/2008 Dowla ................. G06K 7/0008
340/10.1
2016/0363648 A1* 12/2016 Mindell ................. G01S 7/003

OTHER PUBLICATIONS

E-Azim et al., "A Collision Avoidance Methodology for Chipless RFID Tags," Proceedings of the Asia-Pacific Microwave Conference 2011, Dec. 5, 2011, pp. 1514-1517.

* cited by examiner

COMMUNICATION APPARATUS FOR SIGNAL TRANSMISSION AND SIGNAL TRANSMISSION METHOD

CROSS-REFERENCE TO RELATED APPLICATIONS

This application is a continuation of International Application No. PCT/CN2021/098488, filed on Jun. 5, 2021 which claims priority to Chinese Patent Application No. 202010550902.8, filed on Jun. 16, 2020. The disclosures of the aforementioned applications are hereby incorporated by reference in their entireties.

TECHNICAL FIELD

This application relates to the field of communication technologies, and in particular, to a communication apparatus for signal transmission and a signal transmission method.

BACKGROUND

The Internet of Things (Internet of Things, IoT) is an internet with all things connected, and can implement connectivity between the things. The Internet of Things relates to backscatter (backscatter) communication, and the backscatter communication has advantages such as low costs and low power consumption. A backscatter communication system includes a tag device. The tag device is usually not powered by a battery, but is powered by collecting a radio frequency signal in an environment. The backscatter communication system further includes a network device that provides a radio frequency signal for the tag device, and optionally, further includes a relay device that provides a radio frequency signal for the tag device. The relay device is powered by a battery for communication with the network device.

The network device or the relay device sends downlink information to the tag device by using a downlink carrier signal. For example, the downlink carrier signal is c(t), the downlink information is s(t), and a downlink signal is x(t)=c(t)×s(t). The downlink signal carries the downlink information. After receiving the downlink information, the tag device may send uplink information to the network device. Specifically, the tag device may send the uplink information to the network device by using a downlink excitation signal. For example, a downlink excitation signal sent by the network device or the relay device to tag device is c(t), the uplink information is s(t), and an uplink reflection signal is x(t)=c(t)×s(t). The uplink reflection signal carries the uplink information.

Energy of the uplink reflection signal sent by the tag device to the network device is less than energy of the downlink excitation signal. This affects receiving of the uplink reflection signal by the network device. Consequently, the network device misses detecting the tag device. Therefore, how to reduce a probability of missing detecting a tag device is an urgent technical problem to be resolved.

SUMMARY

This application provides a communication apparatus for data transmission and a data transmission method, to reduce a probability of missing detecting a tag device by a network device, and improve signal transmission performance.

A first aspect of this application provides a signal transmission method. The method is applied to a backscatter communication scenario. The method may be performed by a tag device, or may be performed by an apparatus (for example, a processor or a chip) in a tag device. The method uses a tag device as an example, and includes the following content.

The tag device receives a downlink excitation signal, where the downlink excitation signal is a linear frequency modulated signal or a multi-carrier linear frequency modulated signal; generates an uplink reflection signal according to the downlink excitation signal and uplink information; and sends the generated uplink reflection signal to a network device.

In the foregoing method, because the downlink excitation signal is the linear frequency modulated signal or the multi-carrier linear frequency modulated signal, the downlink excitation signal and the uplink reflection signal that is generated according to the downlink excitation signal do not overlap each other in frequency domain and are separated from each other, so that the network device can obtain the uplink reflection signal through frequency domain filtering. This can reduce a probability of missing detecting a tag device by a network device, and improve signal transmission performance.

The downlink excitation signal received by the tag device may come from the network device, or may come from a relay device. This depends on a system including the tag device.

In a possible implementation, when generating the uplink reflection signal, the tag device modulates the uplink information by using a modulation scheme to obtain an uplink modulated signal, and generates the uplink reflection signal according to the downlink excitation signal and the uplink modulated signal. The modulation scheme may include but is not limited to a binary on-off keying OOK modulation scheme, a quadrature phase shift keying QPSK modulation scheme, a hexadecimal quadrature amplitude modulation 16QAM scheme, or another high-order modulation scheme.

The OOK modulation scheme is easy for implementation but has low efficiency.

The QPSK modulation scheme, the 16QAM modulation scheme, or the another high-order modulation scheme has high efficiency and can improve signal transmission efficiency.

In a possible implementation, when the OOK modulation scheme is used, that the uplink reflection signal carries a square wave signal with a variable frequency indicates an On state, or that the uplink reflection signal has no reflected signal indicates an Off state. The square wave signal with a variable frequency can avoid overlapping between the uplink reflection signal and the downlink excitation signal in frequency domain.

In a possible implementation, a modulation scheme used by the tag device is not limited, and a delay line is added between an antenna of the tag device and matched impedance of the tag device, so that the uplink reflection signal is delayed for a specific time period relative to the downlink excitation signal. This avoids overlapping between the uplink reflection signal and the downlink excitation signal in frequency domain. In addition to the manner of adding the delay line, another manner such as a signal delayer may also be used, to delay the uplink reflection signal for a specific time period relative to the downlink excitation signal.

In a possible implementation, when generating the uplink reflection signal, the tag device generates a downlink excitation synchronization signal according to the downlink excitation signal and a synchronization sequence, and generates the uplink reflection signal according to the downlink excitation synchronization signal and the uplink information. The downlink excitation signal is combined with the synchronization sequence, and the linear frequency modulated signal or the multi-carrier linear frequency modulated signal is used as the downlink excitation signal. This avoids overlapping between the downlink excitation signal and the uplink reflection signal in frequency domain, and implements synchronization, improving synchronization precision.

In a possible implementation, when the downlink excitation signal comes from the network device, the downlink excitation signal carries a waveform sequence number corresponding to the network device. Downlink excitation signals sent by different network devices carry different waveform sequence numbers, to distinguish between the downlink excitation signals sent by the different network devices.

In a possible implementation, when the downlink excitation signal comes from a relay device, the downlink excitation signal carries a waveform sequence number allocated by the network device to the relay device. The network device allocates different waveform sequence numbers to different relay devices, to distinguish between downlink excitation signals sent by the different relay devices.

Further, the downlink excitation signal sent by the network device and the downlink excitation signal sent by the relay device carry different waveform sequence numbers.

In a possible implementation, downlink excitation signals corresponding to different waveform sequence numbers are orthogonal, so that uplink reflection signals generated by using the downlink excitation signals corresponding to the different waveform sequence numbers may not overlap each other in frequency domain. This helps the network device obtain different uplink reflection signals, reducing a probability of missing detecting a tag device by a network device.

A second aspect of this application provides a signal transmission method. The method is applied to a backscatter communication scenario. The method may be performed by a network device, or may be performed by an apparatus (for example, a processor or a chip) in a network device. The method uses a network device as an example, and includes the following content.

A network device receives an uplink reflection signal from a tag device, and receives a downlink excitation signal, where the downlink excitation signal is a linear frequency modulated signal or a multi-carrier linear frequency modulated signal; performs fractional Fourier transform on the uplink reflection signal and the downlink excitation signal, to obtain an uplink frequency domain reflection signal and a downlink frequency domain excitation signal, where the uplink frequency domain reflection signal and the downlink frequency domain excitation signal do not overlap each other; and filters out the downlink frequency domain excitation signal, and transforms the uplink frequency domain reflection signal to a time domain, to obtain the uplink reflection signal.

In the method, the downlink excitation signal is the linear frequency modulated signal or the multi-carrier linear frequency modulated signal. Therefore, when the network device transforms the uplink reflection signal and the downlink excitation signal to the frequency domain through fractional Fourier transform, the uplink reflection signal and the downlink excitation signal do not overlap each other in frequency domain. Accordingly, the downlink excitation signal may be filtered out, to obtain the uplink reflection signal. This can reduce a probability of missing detecting a tag device, and improve signal transmission performance.

In a possible implementation, when the downlink excitation signal received by the network device comes from another network device, the downlink excitation signal carries a waveform sequence number corresponding to the another network device. Downlink excitation signals sent by different network devices carry different waveform sequence numbers, to distinguish between the downlink excitation signals sent by the different network devices.

In a possible implementation, when the downlink excitation signal received by the network device comes from a relay device, the downlink excitation signal carries a waveform sequence number allocated by the network device to the relay device. The network device allocates different waveform sequence numbers to different relay devices, to distinguish between downlink excitation signals sent by the different relay devices.

Further, the downlink excitation signal sent by the network device and the downlink excitation signal sent by the relay device carry different waveform sequence numbers.

In a possible implementation, downlink excitation signals corresponding to different waveform sequence numbers are orthogonal, so that uplink reflection signals generated by using the downlink excitation signals corresponding to the different waveform sequence numbers may not overlap each other in frequency domain. This helps the network device obtain different uplink reflection signals and obtain uplink information sent by different tag devices, reducing a probability of missing detecting a tag device by a network device.

In a possible implementation, when allocating the waveform sequence number to the relay device, the network device sends indication information to the relay device. The indication information indicates the waveform sequence number allocated by the network device to the relay device. The network device notifies, by using the indication information, each relay device of an allocated waveform sequence number, so that downlink excitation signals corresponding to different waveform sequence numbers are orthogonal.

In a possible implementation, the network device sends downlink information to the tag device by using a downlink carrier signal. The downlink carrier signal is a linear frequency modulated signal or a multi-carrier linear frequency modulated signal. The downlink carrier signal is the linear frequency modulated signal or the multi-carrier linear frequency modulated signal. This can improve performance in a multi-path transmission scenario.

A third aspect of this application provides a communication apparatus for signal transmission. The communication apparatus has a part or all of the functions of the tag device in the method example in the first aspect. For example, the tag device may have functions for implementing a part or all of embodiments of this application, or may have functions for independently implementing any embodiment of this application. The functions may be implemented by hardware, or may be implemented by hardware executing corresponding software. The hardware or software includes one or more units or modules corresponding to the foregoing functions.

In a possible design, a structure of the communication apparatus may include a processing unit and a communication unit. The processing unit is configured to support the tag device in performing a corresponding function in the foregoing method. The communication unit is configured to support communication between the tag device and another device, for example, a network device or a relay device. The communication apparatus may further include a storage unit. The storage unit is configured to be coupled to the processing unit and the communication unit, and the storage unit stores instructions and data that are necessary for the tag device.

In an implementation, the communication apparatus includes a processing unit and a communication unit.

The communication unit is configured to receive a downlink excitation signal. The downlink excitation signal is a linear frequency modulated signal or a multi-carrier linear frequency modulated signal.

The processing unit is configured to generate an uplink reflection signal according to the downlink excitation signal and uplink information.

The communication unit is further configured to send the uplink reflection signal to a network device.

For example, the processing unit may be a processor, the communication unit may be a transceiver or a communication interface, and the storage unit may be a memory.

In an implementation, the communication apparatus includes a processor and a transceiver.

The transceiver is configured to receive a downlink excitation signal. The downlink excitation signal is a linear frequency modulated signal or a multi-carrier linear frequency modulated signal.

The processor is configured to generate an uplink reflection signal according to the downlink excitation signal and uplink information.

The transceiver is further configured to send the uplink reflection signal to a network device.

In a specific implementation process, the processor may be configured to perform, for example, but not limited to, baseband-related processing. The transceiver may be configured to perform, for example, but not limited to, radio frequency sending and receiving. The foregoing components may be separately disposed on chips that are independent of each other, or at least a part or all of the components may be disposed on a same chip. For example, the processor may be further divided into an analog baseband processor and a digital baseband processor. The analog baseband processor and the transceiver may be integrated onto a same chip, and the digital baseband processor may be disposed on an independent chip. With continuous development of integrated circuit technologies, more components can be integrated onto a same chip. For example, the digital baseband processor and a plurality of application processors (for example, but not limited to, a graphics processor and a multimedia processor) may be integrated onto a same chip. The chip may be referred to as a system on chip (system on chip). Whether all the components are separately disposed on different chips or integrated and disposed on one or more chips usually depends on a specific requirement for a product design. A specific implementation form of the foregoing components is not limited in this application.

A fourth aspect of this application provides a processor, configured to perform the method in the first aspect. In a process of performing the method, a process of signal sending and a process of signal receiving in the foregoing method may be understood as a process of outputting a signal by the processor and a process of receiving an input signal by the processor. Specifically, when outputting the signal, the processor outputs the signal to a transceiver, so that the transceiver transmits the signal. Further, after the signal is output by the processor, other processing may further need to be performed on the signal before the signal arrives at the transceiver. Similarly, when the processor receives the input signal, the transceiver receives the signal, and inputs the signal into the processor. Further, after the transceiver receives the signal, other processing may further need to be performed on the signal before the signal is input into the processor.

Based on the foregoing principle, for example, the receiving a downlink excitation signal mentioned in the foregoing method may be understood as inputting the downlink excitation signal into the processor. For another example, the sending an uplink reflection signal may be understood as outputting the uplink reflection signal by the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In a specific implementation process, the processor may be a processor specially configured to perform these methods, or a processor, for example, a general-purpose processor, that executes computer instructions in a memory to perform these methods. The memory may be a non-transitory (non-transitory) memory such as a read-only memory (read only memory, ROM). The memory and the processor may be integrated onto a same chip, or may be separately disposed on different chips. A type of the memory and a manner of disposing the memory and the processor are not limited in this embodiment of this application.

A fifth aspect of this application provides a computer-readable storage medium, configured to store computer software instructions used by the foregoing tag device. The computer-readable storage medium includes a program for performing the foregoing method in the first aspect.

A sixth aspect of this application provides a computer program product including instructions. When the computer program product runs on a computer, the computer is enabled to perform the method in the first aspect.

A seventh aspect of this application provides a chip system. The chip system includes a processor and an interface, and is configured to support a tag device in implementing the functions in the first aspect, for example, generating an uplink reflection signal. In a possible design, the chip system further includes a memory. The memory is configured to store instructions and data that are necessary for the tag device. The chip system may include a chip, or may include a chip and another discrete component.

An eighth aspect of this application provides a communication apparatus for signal transmission. The communication apparatus has a part or all of the functions of the network device in the method example in the second aspect. For example, the network device may have functions for implementing a part or all of embodiments of this application, or may have functions for independently implementing any embodiment of this application. The functions may be implemented by hardware, or may be implemented by hardware executing corresponding software. The hardware or software includes one or more units or modules corresponding to the foregoing functions.

In a possible design, a structure of the communication apparatus may include a processing unit and a communication unit. The processing unit is configured to support the network device in performing corresponding functions in the foregoing method. The communication unit is configured to support communication between the network device and another device, for example, a tag device or a relay device. The communication apparatus may further include a storage unit. The storage unit is configured to be coupled to the processing unit and the communication unit, and the storage unit stores instructions and data that are necessary for the tag device.

In an implementation, the communication apparatus includes a processing unit and a communication unit.

The communication unit is configured to receive an uplink reflection signal from a tag device, and receive a downlink excitation signal, where the downlink excitation signal is a linear frequency modulated signal or a multi-carrier linear frequency modulated signal.

The processing unit is configured to: perform fractional Fourier transform on the uplink reflection signal and the downlink excitation signal, to obtain an uplink frequency domain reflection signal and a downlink frequency domain excitation signal, where the uplink frequency domain reflection signal and the downlink frequency domain excitation signal do not overlap each other; and filter out the downlink frequency domain excitation signal, and transform the uplink frequency domain reflection signal to a time domain, to obtain the uplink reflection signal.

For example, the processing unit may be a processor, the communication unit may be a transceiver or a communication interface, and the storage unit may be a memory.

In an implementation, the communication apparatus includes a processor and a transceiver.

The transceiver is configured to receive an uplink reflection signal from a tag device, and receive a downlink excitation signal, where the downlink excitation signal is a linear frequency modulated signal or a multi-carrier linear frequency modulated signal.

The processor is configured to: perform fractional Fourier transform on the uplink reflection signal and the downlink excitation signal, to obtain an uplink frequency domain reflection signal and a downlink frequency domain excitation signal, where the uplink frequency domain reflection signal and the downlink frequency domain excitation signal do not overlap each other; and filter out the downlink frequency domain excitation signal, and transform the uplink frequency domain reflection signal to a time domain, to obtain the uplink reflection signal.

For a processor in a specific implementation process, refer to specific descriptions of the processor in the third aspect. Details are not described herein again.

A ninth aspect of this application provides a processor, configured to perform the method in the second aspect. The processor provided in the ninth aspect is similar to the processor provided in the fourth aspect. For details, refer to specific descriptions in the fourth aspect. Details are not described herein again.

A tenth aspect of this application provides a computer-readable storage medium, configured to store computer software instructions used by the foregoing network device. The computer-readable storage medium includes a program for performing the foregoing method in the second aspect.

An eleventh aspect of this application provides a computer program product including instructions. When the computer program product runs on a computer, the computer is enabled to perform the method in the second aspect.

A twelfth aspect of this application provides a chip system. The chip system includes a processor and an interface, and is configured to support a network device in implementing functions in the first aspect, for example, performing fractional Fourier transform on an uplink reflection signal and a downlink excitation signal. In a possible design, the chip system further includes a memory. The memory is configured to store instructions and data that are necessary for the network device. The chip system may include a chip, or may include a chip and another discrete component.

A thirteenth aspect of this application provides a communication system. The communication system includes the tag device configured to implement the method in the first aspect, and the network device configured to implement the method in the second aspect.

DESCRIPTION OF EMBODIMENTS

To better understand the technical solutions provided in this application, technical terms in this application are first described.

1. Backscatter Communication System

Backscatter communication may also be referred to as backscattering communication, reflective communication, reactive communication, passive communication, scatter communication (ambient communication), or the like.

Figure 1:
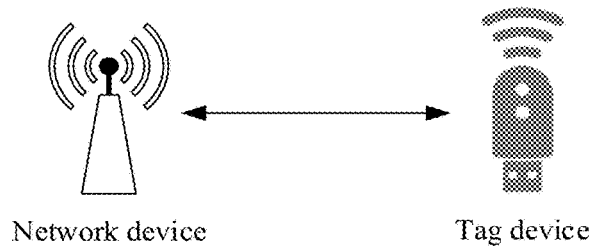
FIG. 1 is a schematic diagram in which a backscatter communication system is a two-point system.

In an implementation, a backscatter communication system includes a tag device and a network device that provides a radio frequency signal for the tag device. The backscatter communication system in this manner may be referred to as a two-point system. For the two-point system, refer to FIG. 1.

The network device may send downlink information to the tag device. The network device sends a downlink carrier signal. The downlink carrier signal carries information to be sent to the tag device, that is, the downlink information.

Figure 1A:
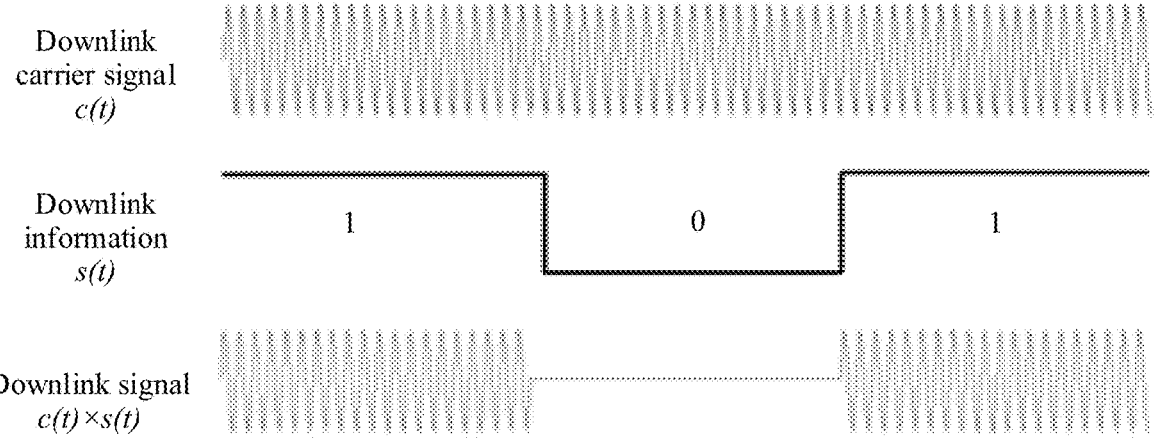
FIG. 1a is a schematic diagram in which a network device sends a downlink signal to a tag device.

For example, the downlink carrier signal sent by the network device is c(t), the downlink information is s(t), and a downlink signal sent by the network device to the tag device is x(t)=c(t)×s(t). Using binary on-off keying (on-off keying, OOK) modulation as an example, a downlink carrier signal sent by the network device is a sine wave, downlink information is [1 0 1], and a downlink signal sent by the network device to the tag device may be shown in FIG. 1a.

The tag device may send uplink information to the network device, for example, feed back uplink information to the network device when receiving downlink information. The tag device does not include a radio frequency link, cannot actively send information, and sends uplink information to the network device by using a downlink excitation signal sent by the network device.

Figure 1B:
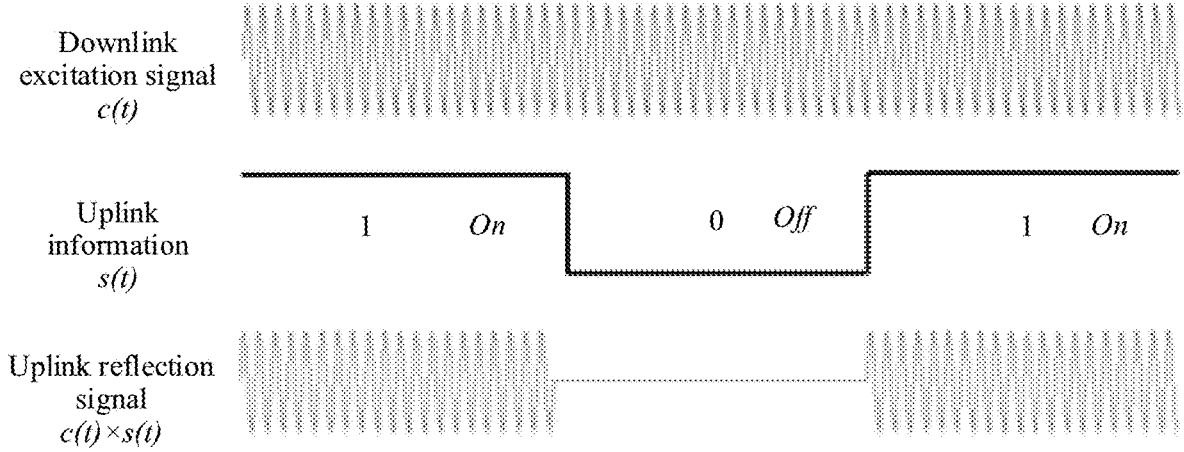
FIG. 1B is a schematic diagram in which a tag device sends an uplink reflection signal to a network device.

For example, the downlink excitation signal sent by the network device is c(t), the uplink information is s(t), the tag device sends s(t) by changing a matching status of an antenna, and a sent uplink reflection signal is x(t)=c(t)×s(t). Using OOK modulation as an example, the tag device sends '1' or '0' by changing an impedance matching status of an antenna. That the impedance matching status is an On state indicates sending '1', and that the impedance matching status is an Off state indicates sending '0', as shown in FIG. 1B. The On state indicates that the antenna is in a reflection state, and the Off state indicates that the antenna is in an absorption state.

Figure 2:
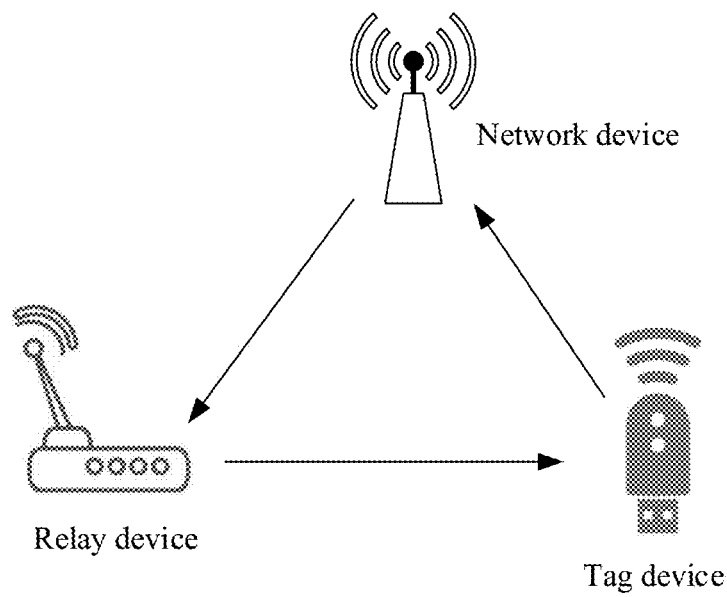
FIG. 2 is a schematic diagram in which a backscatter communication system is a three-point system.

In an implementation, a backscatter communication system includes a tag device, a network device, and a relay device. The backscatter communication system in this manner may be referred to as a three-point system. For the three-point system, refer to FIG. 2. The relay device may be powered by a battery, and may generate and transmit a radio frequency signal. The relay device may be understood as a conventional active device.

In the three-point system, when receiving an indication from the network device, the relay device may send a downlink excitation signal to the tag device. For a process in which the relay device sends a downlink excitation signal to the tag device, refer to the process in which the network device sends a downlink excitation signal to the tag device. For a communication process between the relay device and the network device, refer to a communication process between an active device and a network device. The tag device sends an uplink reflection signal to the network device by using a downlink excitation signal sent by the relay device.

2. Modulation Scheme

In this application, a modulation scheme may include but is not limited to an OOK modulation scheme, a quadrature phase shift keying (quadrature phase shift keying, QPSK) modulation scheme, a hexadecimal quadrature amplitude modulation (16-quadrature amplitude modulation, 16-QAM) scheme, or another high-order modulation scheme.

It is assumed that a received signal is x, a reflected signal is y, and a relationship between the two signals may be expressed as y=Γ*x. Γ represents a reflection coefficient, and may be expressed as:

$$\Gamma = \frac{Z_i - Z_a^*}{Z_i + Z_a}$$

$Z_a$ represents impedance of an antenna, which is generally 50 ohms; $Z_a^*$ represents a conjugate of $Z_a$, and $Z_i$ represents matched impedance in an i th state.

Figure 3A:
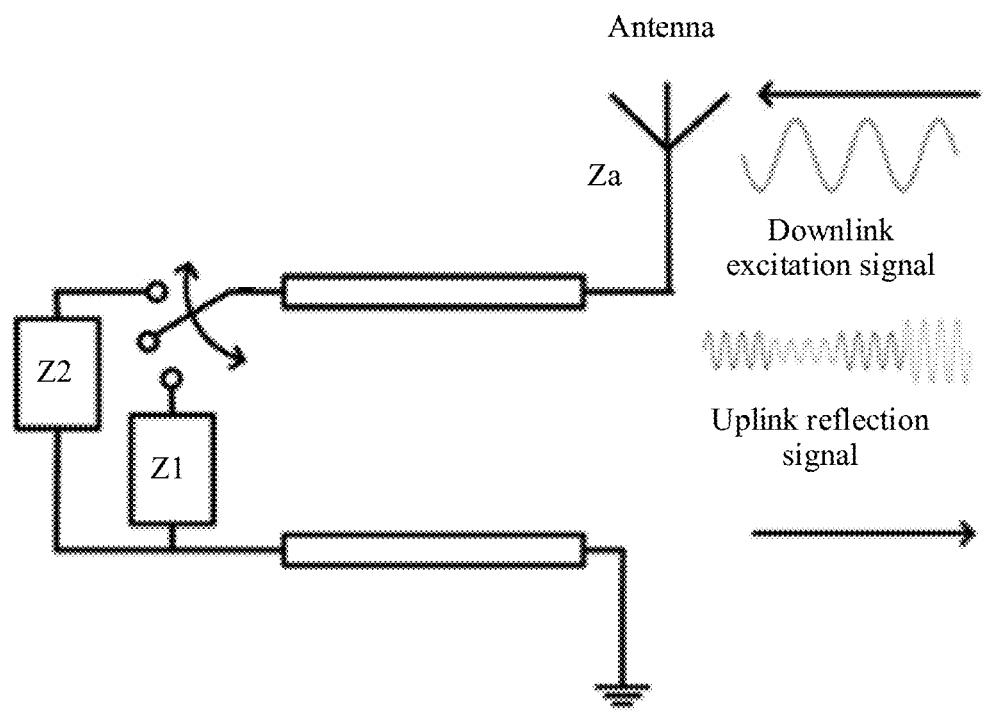
FIG. 3a is a schematic diagram in which a tag device sends uplink information by using an OOK modulation scheme.

For example, the tag device sends uplink information by using the OOK modulation scheme. Refer to FIG. 3a, $Z_i$ in the reflection coefficient may be $Z_1$ or $Z_2$ in FIG. 3a. When the tag device sends '0', $Z_i=Z_a^*$ is selected, the reflection coefficient is 0, and energy of a downlink excitation signal is absorbed. In this case, no signal is sent, and the impedance matching status of the antenna is an Off state. When the tag device sends '1', $Z_i \ne Z_a^*$ is selected, the reflection coefficient is not 0, and energy of a downlink excitation signal is reflected. In this case, the signal is sent, and the impedance matching status of the antenna is an On state.

It is an easy implementation for the tag device to use the OOK modulation scheme. However, sending one bit of information ('0' or '1') at a time causes low efficiency. At a cost of implementation complexity, the tag device may use a high-order modulation scheme to improve efficiency.

Figure 3B:
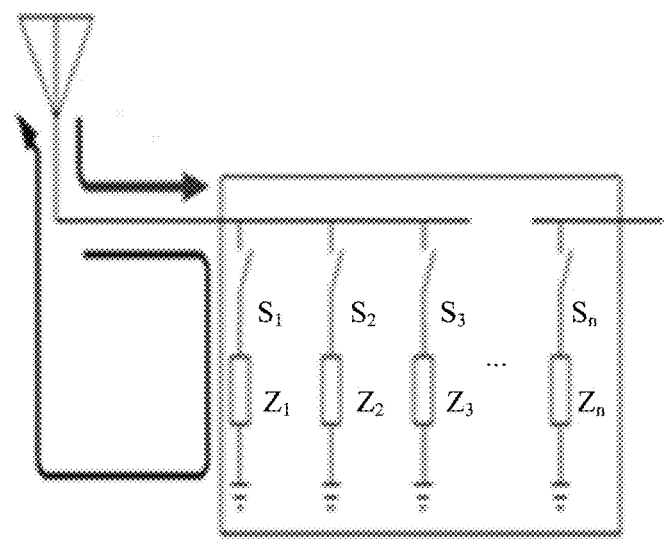
FIG. 3b is a schematic diagram in which a tag device sends uplink information by using a high-order modulation scheme.

For example, the tag device sends uplink information by using a high-order modulation scheme. Refer to FIG. 3b, a 16-QAM modulation scheme is used as an example, and a value corresponding to a 16-QAM constellation diagram is $S_n=a_n+b_n*j$, n=1, ..., 16. j represents an imaginary number symbol, and $a_n$ and $b_n$ are real numbers corresponding to each constellation point. Correspondingly, an antenna of the tag device has 16 corresponding matched impedance values, and a reflection coefficient thereof is:

$$\Gamma = \frac{Z_n - Z_a^*}{Z_n + Z_a} = S_n$$

3. Sub-Carrier (Sub-Carrier) Manner

In a backscatter communication system, the tag device reflects or absorbs a downlink excitation signal by adjusting an impedance matching status of an antenna, to implement a function of sending '0' or '1'.

For example, in the three-point system, when the tag device generates an uplink reflection signal, the relay device keeps sending a downlink excitation signal. When receiving the uplink reflection signal from the tag device, the network device also receives the downlink excitation signal from the relay device. The downlink excitation signal causes interference to reception of the uplink reflection signal. It is assumed that a signal received by the network device is y=Γ*x+x, where X represents a downlink excitation signal, and x represents an uplink reflection signal. Because energy of a reflected radio signal decreases sharply, energy of Γ*x is far less than X. In other words, presence of Γ*x has little impact on y. Therefore, it is difficult for the network device to correctly demodulate Γ*x.

The tag device generates the uplink reflection signal in a sub-carrier manner, to overcome the interference caused by the downlink excitation signal to the uplink reflection signal, so that the network device can eliminate the interference caused by the downlink excitation signal to the uplink reflection signal by using a frequency domain filtering technology.

Figure 4:
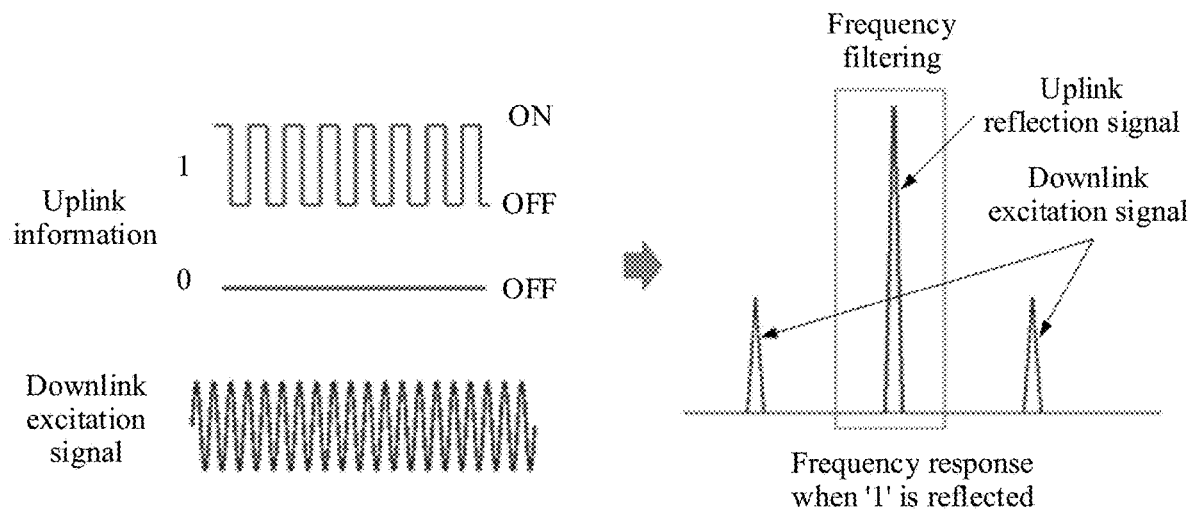
FIG. 4 is a schematic diagram of an implementation example of a sub-carrier manner.

Refer to a diagram of an implementation example of a sub-carrier manner shown in FIG. 4. In FIG. 4, when sending uplink information '1', the tag device switches an impedance matching status of the antenna between the On state and the Off state. A time length occupied for sending '1' and a switching frequency between On/Off states are specified in a standard. When sending uplink information '0', the tag device keeps the impedance matching status of the antenna in the Off state. A time length occupied for sending '0' is the same as a time length occupied for sending '1'. When receiving the uplink reflection signal, the network device transforms the uplink reflection signal to a frequency domain. For '1' sent by the tag device, the uplink reflection signal and the downlink excitation signal are separated in frequency domain. In this case, the network device only needs to remove the downlink excitation signal by using the frequency domain filtering technology, to eliminate the interference caused by the downlink excitation signal to the uplink reflection signal.

4. Linear Frequency Modulated Signal and Multi-Carrier Linear Frequency Modulated Signal A time domain signal may be transformed, through Fourier transform, to a frequency domain for analysis and processing. In Fourier transform, a Fourier series is used as a basis function of the transform, and a Fourier series may be represented as a complex number including a sine wave and a cosine wave.

A sequence $x(n)$, $n=0, 1, \ldots, N-1$ is transformed to a frequency domain through Fourier transform, to obtain a sequence $X_F(k)$, $k=0, 1, \ldots, N-1$. A calculation formula is as follows:

$$X_F(k) = \sum_{n=0}^{N-1} x(n) * e^{-j*\frac{2*\pi}{N}*k*n}$$

Correspondingly, a calculation formula for transforming a sequence $X_F(k)$ to a time domain is as follows:

$$x(n) = \frac{1}{N} * \sum_{n=0}^{N-1} X_F(k) * e^{j*\frac{2*\pi}{N}*k*n}$$

In fractional Fourier transform, a linear frequency modulation (linear frequency modulation, LFM) signal is used as a basic signal, and a time domain signal is transformed to a fractional transform domain. A linear frequency modulated signal may also be referred to as a chirp (chirp) signal, and is a signal whose instantaneous frequency changes linearly with time.

A time domain expression of the LFM signal may be as follows:

$$x(t) = e^{j*\pi*\frac{\beta*t^2}{T}}, 0 \le t \le T$$

A bandwidth of the LFM signal is approximately equal to $\beta$.

The fractional Fourier transform in which the LFM signal is used as the base signal is specifically described as follows.

A sequence $x(n)$, $n=0, 1, \ldots, N-1$ is transformed to a fractional transform domain through fractional Fourier transform, to obtain a sequence $\hat{X}_F(k)$.

A time interval $\Delta T$ and a fractional Fourier domain $\Delta U$ are defined, and both satisfy the following relationship:

$$\Delta T * \Delta U = \frac{2*\pi*|\sin\alpha|}{N}$$

$\alpha$ is a parameter corresponding to the fractional Fourier transform, and different $\alpha$ correspond to different fractional Fourier transforms.

A sequence $\hat{X}_F(k)$ includes the following two cases according to $\sin \alpha > 0$ and $\sin \alpha < 0$:

(1)

When $\sin\alpha > 0$, $\hat{X}_F(k) =$ $$\sqrt{\frac{\sin\alpha - j\cos\alpha}{N}} * e^{\frac{j}{2}*n^2*\Delta U^2*\cot\alpha} * \sum_{n=0}^{N-1} x(n) * e^{-j*\frac{2*\pi*n*k}{N}} * e^{\frac{j}{2}*n^2*\Delta T^2*\cot\alpha}.$$

(2)

When $\sin\alpha < 0$, $\hat{X}_F(k) =$ $$\sqrt{\frac{-\sin\alpha + j\cos\alpha}{N}} * e^{\frac{j}{2}*n^2*\Delta U^2*\cot\alpha} * \sum_{n=0}^{N-1} x(n) * e^{-j*\frac{2*\pi*n*k}{N}} * e^{\frac{j}{2}*n^2*\Delta T^2*\cot\alpha}.$$

The sequence is transformed back to a time domain, and $\beta = -\alpha$ is defined. A transform formula is classified into the following two cases according to $\sin \beta > 0$ and $\sin \beta < 0$:

(3)

$\sin\beta > 0$, $\hat{X}_F(k) =$ $$\sqrt{\frac{\sin\beta - j\cos\beta}{N}} * e^{\frac{j}{2}*n^2*\Delta T^2*\cot\beta} * \sum_{n=0}^{N-1} x(n) * e^{-j*\frac{2*\pi*n*k}{N}} * e^{\frac{j}{2}*n^2*\Delta U^2*\cot\beta}$$

(4)

$\sin\beta < 0$, $x(n) =$ $$\sqrt{\frac{-\sin\beta + j\cos\beta}{N}} * e^{\frac{j}{2}*n^2*\Delta U^2*\cot\beta} * \sum_{n=0}^{N-1} x(n) * e^{-j*\frac{2*\pi*n*k}{N}} * e^{\frac{j}{2}*n^2*\Delta T^2*\cot\beta}$$

In this application, an LFM signal may be used as a downlink carrier signal and a downlink excitation signal. A mathematical expression in which the LFM signal is used as the downlink carrier signal and the downlink excitation signal is:

$$e^{j*\pi*\frac{\beta}{T}*(t\%T)^2}$$

% represents a modulo operation, and a signal whose time length is T may be expressed as:

$$x_0(t) = e^{j*\pi*\frac{\beta}{T}*t^2}, 0 \le t \le T$$

Figure 5A:
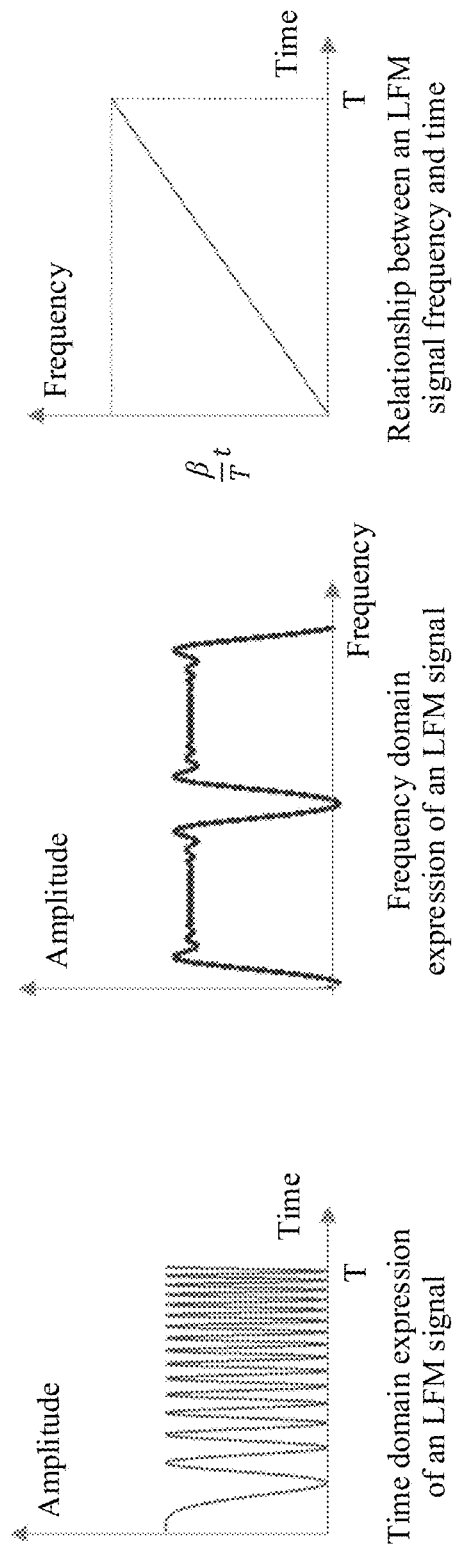
FIG. 5a is a schematic diagram of a time domain waveform and a frequency domain waveform of a linear frequency modulated signal.

A frequency of $x_0(t)$ increases linearly with time. The frequency may be expressed as $\beta*t/T$. For a linear increase relationship, refer to FIG. 5a. For a time domain waveform and a frequency domain waveform of an LFM signal, refer to FIG. 5a.

When an LFM signal is used as a downlink carrier signal and a downlink excitation signal, a signal $x_0(t)$ whose time length is T is repeatedly sent.

A multi-carrier LFM signal is designed based on the LFM signal, and a time domain expression of a multi-carrier LFM signal may be as follows:

$$\sum_{n=1}^{N} e^{j*2*\pi*(n-1)*\Delta F*t} * x_0((t\%T)^2), x_0(t) = e^{j*\pi*\frac{\beta*t^2}{T}}, 0 \le t \le T$$

Figure 5B:
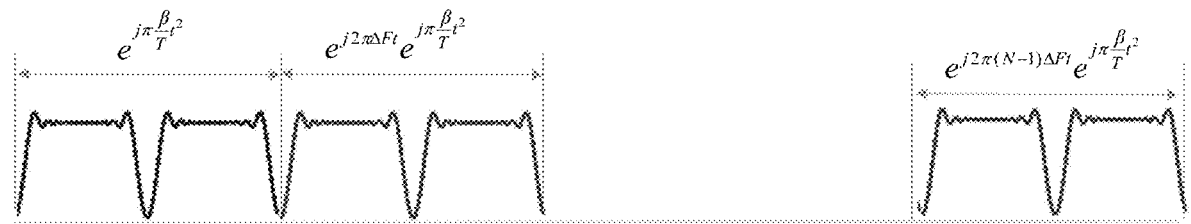
FIG. 5b is a schematic diagram of a frequency domain waveform of a multi-carrier linear frequency modulated signal.

$e^{j*2*\pi*(n-1)*\Delta F*t}$ represents that a frequency domain response of a signal is shifted by $(n-1)*\Delta F$. For a frequency domain waveform of a multi-carrier LFM signal, refer to FIG. 5b.

Compared with the LFM signal, the multi-carrier LFM signal has a higher peak value and better performance.

Currently, a sine wave signal of a narrowband pulse is used as a downlink excitation signal in a backscatter system. For example, as shown in FIG. 1B and FIG. 4, a network device may fail to detect an uplink reflection signal in a complex multi-path environment, resulting in missing detecting a tag device by the network device.

In view of this, this application provides a signal transmission method and apparatus. An LFM signal or a multi-carrier LFM signal is used as a downlink excitation signal. This can reduce a probability of missing detecting a tag device by a network device, and improve signal transmission performance.

Figure 6:
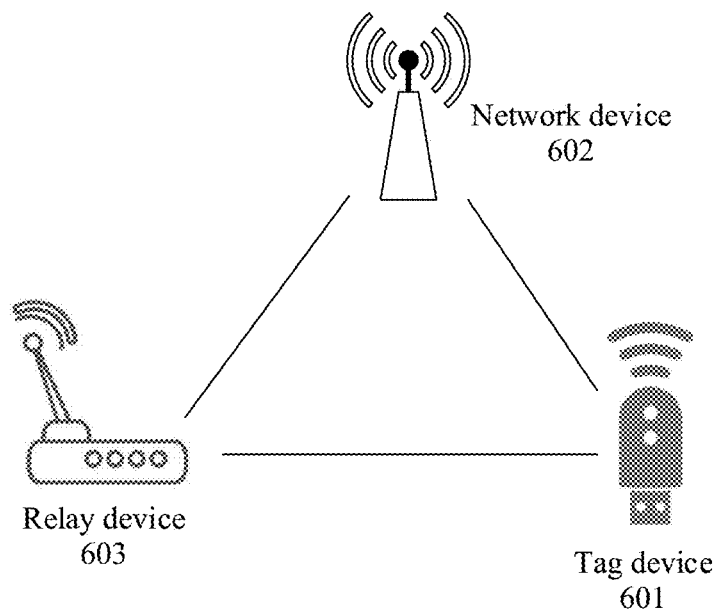
FIG. 6 is a schematic diagram of a network architecture to which this application is applied.

For example, FIG. 6 is a schematic diagram of a network architecture to which this application is applied. The network architecture shown in FIG. 6 includes a tag device 601 and a network device 602, and optionally, further includes a relay device 603. It should be noted that a quantity and a form of each device in FIG. 6 are used as an example, and do not constitute a limitation on this application. For example, in actual application, two or more network devices are included, and two or more relay devices are included.

A tag device is a device that cannot generate a radio frequency signal by itself. The tag device may also be referred to as a passive device, a reflector, a backscatter terminal (backscatter terminal), a reflecting terminal, a semi-passive device (semi-passive device), a scattered signal device (ambient signal device), a tag (Tag), a tag node, or the like. In this application, an apparatus configured to implement a function of a tag device may be a tag device, or may be an apparatus, for example, a chip system, that can support a tag device in implementing the function. In this embodiment of this application, the chip system may include a chip, or may include a chip and another discrete component. In this application, an example in which an apparatus configured to implement a function of a tag device is a tag device is used to describe the technical solutions provided in embodiments of this application.

A network device is a device that receives a mixed signal, and may also be referred to as a card reader, a receiver, a receiving machine, a receiving device, or the like. The network device may include a base station. The base station may have a plurality of forms, for example, a macro base station, a micro base station, a relay station, and an access point. The base station may be a base station in a long term evolution (long term evolution, LTE) system, a base station in a new radio (new radio, NR) system, or a base station in a future communication system. In this application, an apparatus configured to implement a function of a network device may be a network device, or may be an apparatus, for example, a chip system, that can support a network device in implementing the function. In this application, an example in which an apparatus configured to implement a function of a network device is a network device is used to describe the technical solutions provided in embodiments of this application. The NR system may also be referred to as a 5th generation (5th generation, 5G) system.

A relay device is referred to as a device that can generate a radio frequency signal and can provide the radio frequency signal for a tag device. The relay device may also be referred to as a radio frequency device, an auxiliary device, an auxiliary apparatus, an exciter, an excitation source, a radio frequency source, a helper (helper), a relay (relay), an interrogator (interrogator), or the like. In this application, an apparatus configured to implement a function of a relay device may be a relay device, or may be an apparatus, for example, a chip system, that can support a relay device in implementing the function. In this application, an example in which an apparatus configured to implement a function of a relay device is a relay device is used to describe the technical solutions provided in embodiments of this application.

Optionally, the relay device may be user equipment (user equipment, UE). The UE may be a device with a wireless transceiver function. The UE may be deployed on land, for example, in an indoor, outdoor, or vehicle-mounted manner, may be deployed on water (for example, on a ship), and may also be deployed in the air (for example, on an airplane, a balloon, or a satellite). The UE includes a handheld device, vehicle-mounted device, wearable device, or computing device with a wireless communication function. For example, the UE may be a mobile phone (mobile phone), a tablet computer, or a computer with a wireless transceiver function. Alternatively, the UE may be a virtual reality (virtual reality, VR) terminal device, an augmented reality (augmented reality, AR) terminal device, a wireless terminal in industrial control, a wireless terminal in self driving, a wireless terminal in remote medical, a wireless terminal in smart grid, a wireless terminal in smart city (smart city), a wireless terminal in smart home (smart home), or the like.

In this application, the network device 602 may provide a downlink excitation signal for the tag device 601, or the relay device 603 may provide a downlink excitation signal for the tag device 601. The downlink excitation signal is no longer a sine wave signal or a cosine wave signal, but an LFM signal or a multi-carrier LFM signal. The tag device 601 sends an uplink reflection signal according to a downlink excitation signal. Because the downlink excitation signal is an LFM signal or a multi-carrier LFM signal, the network device 602 filters out the downlink excitation signal, to obtain the uplink reflection signal. This avoids missing detecting a tag device.

For example, this application is applied to a logistics system. Abase station installed in a logistics warehouse takes stock of information about a material device (the material device is equipped with tags) in the logistics warehouse. The base station requests the material device equipped with a sensor to report information in the sensor, for example, humidity and temperature. In this example, the base station is a network device, and the material device is a tag device. Optionally, a wireless access point is installed in the material warehouse. The wireless access point may communicate with the base station, and the wireless access point is a relay device. Use of this application can prevent the base station from missing collecting statistics of information reported by the material device.

It should be noted that a name of the backscatter communication system and a name of a communication node included in the system are used as examples, and do not constitute a limitation on this application. For example, the backscatter communication system includes a first device, a second device, and a third device. The first device corresponds to the tag device, the second device corresponds to the network device, and the third device corresponds to the relay device.

The signal transmission method and apparatus provided in this application may be applied to a backscatter communication system. The backscatter communication system may be applied to systems of a plurality of communication standards, and may include but is not limited to an LTE system, an NR system, a system of a future communication standard, or the like.

The following describes the signal transmission method provided in this application.

Figure 7:
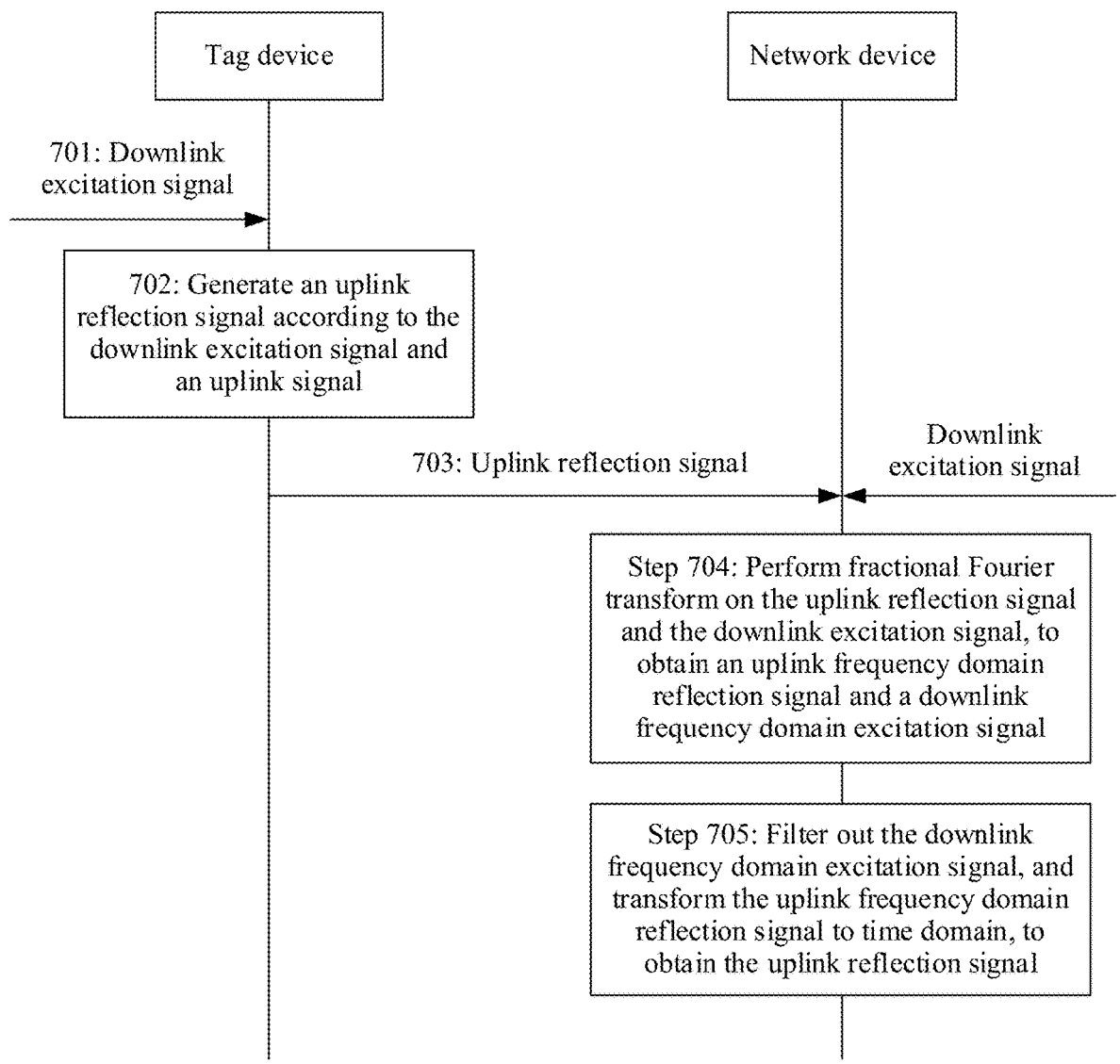
FIG. 7 is a schematic flowchart of a signal transmission method according to this application.

FIG. 7 is a schematic flowchart of a signal transmission method according to this application. The procedure may include but is not limited to the following steps.

Step 701: A tag device receives a downlink excitation signal.

The downlink excitation signal is an LFM signal or a multi-carrier LFM signal. For the LFM signal and the multi-carrier LFM signal, refer to the foregoing specific descriptions thereof. Details are not described herein again.

The downlink excitation signal received by the tag device may come from a network device, or may come from a relay device.

Step 702: The tag device generates an uplink reflection signal according to the downlink excitation signal and uplink information.

In a possible implementation, the tag device modulates the uplink information by using a modulation scheme to obtain an uplink modulated signal, and generates the uplink reflection signal according to the downlink excitation signal and the uplink modulated signal. The modulation scheme may be an OOK modulation scheme, a QPSK modulation scheme, a 16-QAM scheme, or another high-order modulation scheme. The modulation scheme used by the tag device may be a default modulation scheme, a modulation scheme configured by the network device for the tag device, or a modulation scheme pre-agreed between the tag device and the network device.

If the modulation scheme used by the tag device is the OOK modulation scheme, that the uplink reflection signal carries a square wave signal with a variable frequency indicates an On state, that is, an impedance matching status of an antenna of the tag device is an On state, or that the uplink reflection signal has no reflected signal indicates an Off state, that is, an impedance matching status of the antenna of the tag device is an Off state. For using the OOK modulation scheme by the tag device, refer to specific descriptions in Embodiment 1.

A modulation scheme is not limited, and the uplink reflection signal is delayed for a specific time period relative to the downlink excitation signal. For example, there is a delay line between the antenna of the tag device and matched impedance, and the delay line causes the uplink reflection signal to be delayed for a specific time period relative to the downlink excitation signal. For delaying the uplink reflection signal for the specific time period relative to the downlink excitation signal, refer to specific descriptions in Embodiment 2.

In a possible implementation, the tag device generates a downlink excitation synchronization signal according to the downlink excitation signal and a synchronization sequence, and generates the uplink reflection signal according to the downlink excitation synchronization signal and the uplink information. It may be understood that, combining the LFM signal or the multi-carrier LFM signal with the synchronization sequence can eliminate interference caused by the downlink excitation signal to the uplink reflection signal, and can implement synchronization between the tag device and the network device. For a manner of combining the LFM signal or the multi-carrier LFM signal with the synchronization sequence, refer to specific descriptions in Embodiment 3.

When a backscatter communication system includes two or more network devices, downlink excitation signals sent by different network devices carry different waveform sequence numbers. For example, a backscatter communication system includes a network device 1 and a network device 2. A downlink excitation signal sent by the network device 1 carries a waveform sequence number 1 corresponding to the network device 1, and a downlink excitation signal sent by the network device 2 carries a waveform sequence number 2 corresponding to the network device 2.

When a backscatter communication system includes two or more relay devices, a network device allocates waveform sequence numbers to the relay devices. Downlink excitation signals sent by different relay devices carry different waveform sequence numbers. For example, a backscatter communication system includes a relay device 1 and a relay device 2. A network device allocates a waveform sequence number 1 to the relay device 1, and allocates a waveform sequence number 2 to the relay device 2. A downlink excitation signal sent by the relay device 1 carries the waveform sequence number 1, and a downlink excitation signal sent by the relay device 2 carries the waveform sequence number 2.

When a backscatter communication system includes a plurality of network devices and a plurality of relay devices, waveform sequence numbers carried in downlink excitation signals sent by the network devices and the relay devices are different, waveform sequence numbers carried in downlink excitation signals sent by different network devices are different, and waveform sequence numbers carried in downlink excitation signals sent by different relay devices are different. For example, a backscatter communication system includes a network device 1, a network device 2, a relay device 1, and a relay device 2. A downlink excitation signal sent by the network device 1 carries a waveform sequence number 1, a downlink excitation signal sent by the network device 2 carries a waveform sequence number 2, a downlink excitation signal sent by the relay device 1 carries a waveform sequence number 3, and a downlink excitation signal sent by the relay device 2 carries a waveform sequence number 4.

Downlink excitation signals corresponding to different waveform sequence numbers are orthogonal, so that uplink reflection signals sent by different tag devices are orthogonal. This avoids interference between uplink reflection signals sent by different tag devices. For details, refer to specific descriptions in Embodiment 4.

Step 703: The tag device sends the uplink reflection signal to a network device.

When generating the uplink reflection signal, the tag device sends the uplink reflection signal to the network device.

Step 704: The network device performs fractional Fourier transform on the uplink reflection signal and the downlink excitation signal, to obtain an uplink frequency domain reflection signal and a downlink frequency domain excitation signal.

In a process in which the tag device sends the uplink reflection signal, the relay device or another network device continuously sends a downlink excitation signal. In this case, the network device may receive both the uplink reflection signal and the downlink excitation signal. The network device performs fractional Fourier transform on the uplink reflection signal and the downlink excitation signal, to obtain the uplink frequency domain reflection signal and the downlink frequency domain excitation signal.

Step 705: The network device filters out the downlink frequency domain excitation signal, and transforms the uplink frequency domain reflection signal to a time domain, to obtain the uplink reflection signal.

The downlink excitation signal is the LFM signal or the multi-carrier LFM signal. Therefore, when obtaining the uplink frequency domain reflection signal and the downlink frequency domain excitation signal, the network device may filter out the downlink frequency domain excitation signal by using a filtering technology, and transform the uplink frequency domain reflection signal to a time domain, to obtain the uplink reflection signal. The network device may obtain the uplink information from the uplink reflection signal. For example, in a logistics system, an uplink reflection signal sent by a logistics device to a base station carries information such as temperature and humidity.

Step 704 and step 705 are correspondingly described in each embodiment.

In the embodiment shown in FIG. 7, the downlink excitation signal is an LFM signal or a multi-carrier LFM signal. This helps the network device filter out the downlink excitation signal, to obtain the uplink reflection signal, reducing a probability of missing detecting a tag device by a network device, and improving signal transmission performance.

The following describes Embodiment 1 to Embodiment 4 in detail.

Embodiment 1: A Tag Device Uses an OOK Modulation Scheme

In FIG. 4, a tag device modulates uplink information by using an OOK modulation scheme. Even if a downlink excitation signal is an LFM signal or a multi-carrier LFM signal, a generated uplink reflection signal carrying '1' is a rectangular square wave signal with a fixed frequency. Consequently, the downlink excitation signal and the uplink reflection signal overlap each other in frequency domain, the downlink excitation signal cannot be distinguished from the uplink reflection signal in frequency domain, and interference caused by the downlink excitation signal to the uplink reflection signal cannot be eliminated by using a filtering technology.

Figure 8:
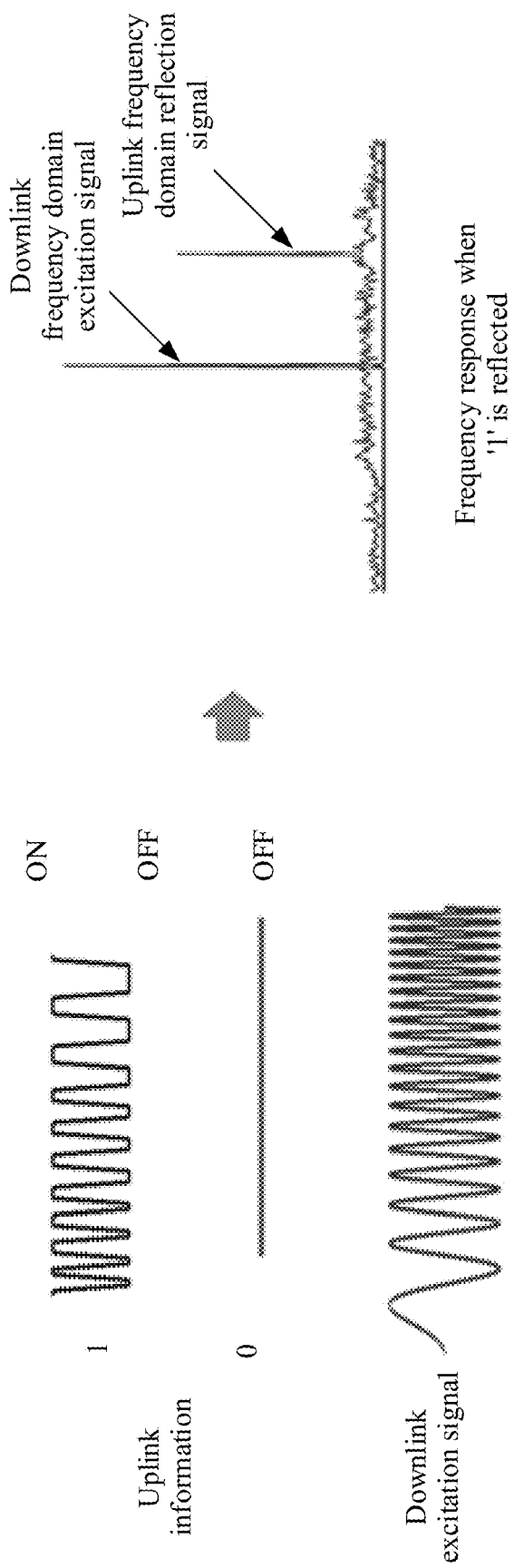
FIG. 8 is a schematic diagram of sending an uplink reflection signal according to Embodiment 1.

Therefore, when the tag device uses the OOK modulation scheme, an uplink reflection signal carrying '1' is a square wave signal with a variable frequency, instead of a rectangular square wave signal with a fixed frequency. How the frequency changes and a type of the square wave signal are not limited in this application. When the uplink reflection signal carries a square wave signal with a variable frequency, an impedance matching status of an antenna is an On state; or when the uplink reflection signal has no reflected signal, that is, when '0' is sent, an impedance matching status of the antenna is an Off state. Reference may be made to FIG. 8.

Basic parameters of the fractional Fourier transform are set as follows: $\alpha$ is a rotation angle, $\Delta T$ is a sampling interval in time domain, and $\Delta U$ is a frequency domain sampling interval in fractional transform domain, where $$\alpha \neq \pm\pi, \alpha \neq \pm 0.5\pi, \text{ and } dU = \frac{2*\pi*|\sin\alpha|}{N*d*T}.$$

According to the foregoing assumption, an LFM signal of one period may be expressed as $s_0 = \exp(j*0.5 \cot\alpha*n^2*\Delta T^2)$, where $n = 0, 1, \ldots, N-1$. LFM signals sent by a network device or a relay device are repetition of $s_0$.

The uplink reflection signal generated by the tag device may be expressed as:

$$x_0 = \exp(j*0.5\cot\alpha*n^2*\Delta T^2) * \exp\left(j*\frac{2\pi}{N}*dN\right) * \exp(j*0.5\cot\alpha*dN^2*\Delta U^2)$$

When sending '1', the tag device generates an uplink reflection signal by using a square wave signal with a variable frequency. When an actual value of $x_0$ is greater than or equal to 0, an impedance matching status of an antenna is an On state; or when an actual value of $x_0$ is less than 0, an impedance matching status of an antenna is an Off state.

When receiving the uplink reflection signal and the downlink excitation signal, the network device performs fractional Fourier transform on the received signals, to obtain an uplink frequency domain reflection signal and a downlink frequency domain excitation signal. The uplink frequency domain reflection signal and the downlink frequency domain excitation signal are separated from each other, as shown in FIG. 8. The network device can filter out the downlink frequency domain excitation signal by using a filtering technology, and transforms the uplink frequency domain reflection signal to a time domain, to obtain the uplink reflection signal.

The downlink excitation signal may be an LFM signal, or may be a multi-carrier LFM signal. In the case of a multi-carrier LFM signal, a peak value of the multi-carrier LFM signal is greater than 1. This can overcome deep fading caused by a plurality of paths, and can fully utilize performance of an envelope detector.

Figure 9A:
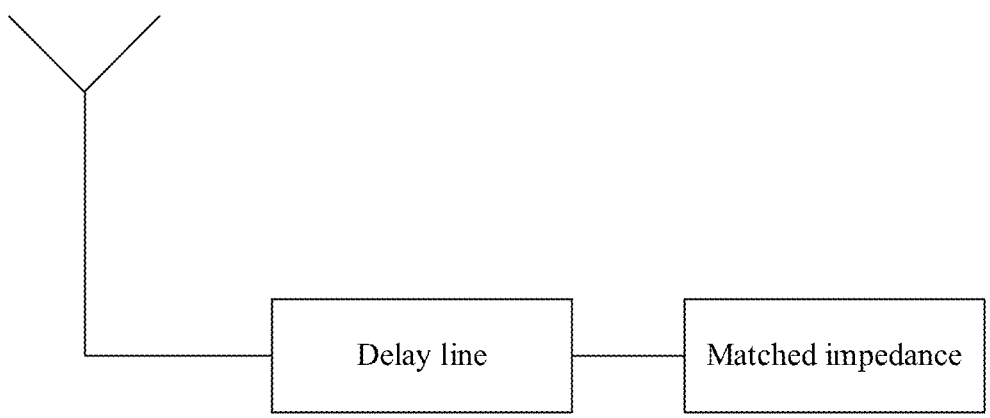
FIG. 9a is a schematic diagram of a structure in which a delay line is inserted between an antenna of a tag device and matched impedance.

Embodiment 2: An Uplink Reflection Signal is Delayed for a Specific Time Period Relative to a Downlink Excitation Signal For example, a delay line may be inserted between an antenna of a tag device and matched impedance, to delay an uplink reflection signal for a specific time relative to a downlink excitation signal. For details, refer to a diagram of a structure shown in FIG. 9a.

Basic parameters of the fractional Fourier transform are set: $\alpha$ is a rotation angle, $\Delta T$ is a sampling interval in time domain, and $\Delta U$ is a frequency domain sampling interval in fractional transform domain, where $\alpha \neq \pm\pi$, $\alpha \neq \pm 0.5\pi$, and $$dU = \frac{2*\pi*|\sin\alpha|}{N*d*T}.$$

A delay of an uplink reflection signal relative to a downlink excitation signal is set to be d*T, where d is greater than 0 and less than 1.

According to the foregoing assumption, an LFM signal of one period T=N*ΔT may be expressed as $s_0=\exp(j*0.5 \cot \alpha *n^2*\Delta T^2)$, where n=0, 1, ..., N−1. LFM signals sent by a network device or a relay device are repetition of $s_0$.

The tag device generates the uplink reflection signal according to a pre-configuration or an instruction of the network device. For example, a downlink excitation signal corresponds to two LFM signals in a time period 2*T, a time period for impedance matching of the tag device is configured as T for reflection, and an impedance matching status of an antenna of the tag device is an Off state within a time period T−d*T.

Figure 9B:
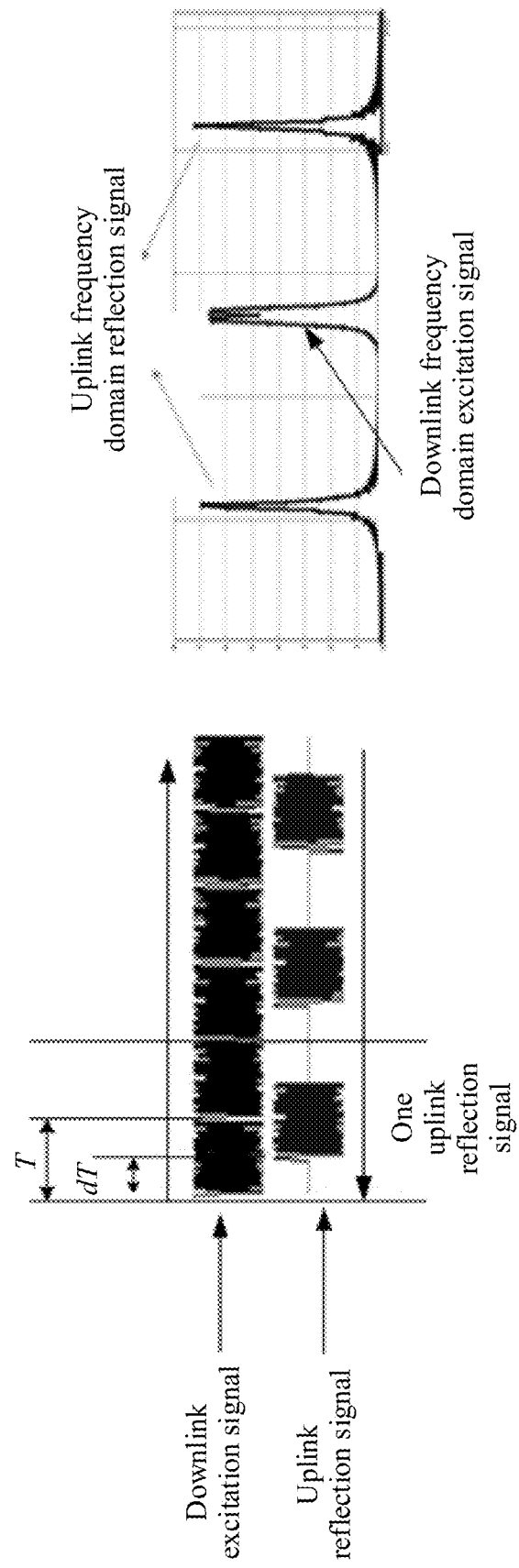
FIG. 9b is a schematic diagram of an uplink frequency domain reflection signal and a downlink excitation signal according to Embodiment 2.

When receiving the uplink reflection signal and the downlink excitation signal, the network device performs fractional Fourier transform with two LFM signals as a period, to obtain an uplink frequency domain reflection signal and a downlink frequency domain excitation signal. The uplink frequency domain reflection signal and the downlink frequency domain excitation signal are separated from each other, as shown in FIG. 9b. The network device can filter out the downlink frequency domain excitation signal by using a filtering technology, and transforms the uplink frequency domain reflection signal to a time domain, to obtain the uplink reflection signal.

The downlink excitation signal may be an LFM signal, or may be a multi-carrier LFM signal. Use of a multi-carrier LFM signal can overcome deep fading caused by a plurality of paths, and can fully utilize performance of an envelope detector.

A modulation scheme used by the tag device to modulate the uplink information is not limited in Embodiment 2. Use of a high-order modulation may improve processing efficiency.

Embodiment 3: Combine a Downlink Excitation Signal and a Synchronization Sequence An LFM signal or a multi-carrier LFM signal is combined with a synchronization sequence, so that a network device can synchronize a downlink excitation signal.

The downlink excitation signal sent by the network device is an LFM signal, and bandwidth of the LFM signal is B. M LFM signals form an LFM signal unit, which can be expressed as follows:

$$LFM_M = e^{\pi * \frac{B}{T}(t\%T)^2}, t = 0, \ldots, M*T$$

M is an integer greater than or equal to 1, and % is a modulo operation. The LFM signal unit is repetition of the M LFM signals.

A length of the synchronization sequence is N, and a corresponding sequence value is $c_n$, n=1, ..., N.

A tag device combines the downlink excitation signal and the synchronization sequence, to generate a downlink excitation synchronization signal. A downlink excitation synchronization signal unit may be expressed as follows: $s_n(t) = c_n*LFM_M(t \% n*M*T)$, t=0, ..., M*N*T. A downlink excitation synchronization signal is repetition of a downlink excitation synchronization signal unit, and a quantity of times of repetition is related to a time length of an uplink reflection signal. For example, if the time length of the uplink reflection signal is $T_1$, the quantity of times of repetition of the downlink excitation synchronization signal unit is greater than or equal to the following value:

$$\text{ceil}\left(\frac{T_1}{M*N*T}\right)$$

ceil(·) represents rounding.

Embodiment 3 may be combined with Embodiment 1 or Embodiment 2. In this way, synchronization is implemented, and a network device is prevented from missing detecting information sent by a tag device. In Embodiment 3, a multi-carrier LFM signal may alternatively be combined with the synchronization sequence.

Embodiment 4: A Total Quantity of Network Devices and Relay Devices is Greater than 2

In a backscatter communication system, when a total quantity of network devices and relay devices is greater than 2, downlink excitation signals sent by different network devices carry waveform sequence numbers corresponding to the downlink excitation signals, downlink excitation signals sent by different relay devices carry waveform sequence numbers allocated by the network devices to the relay devices, and downlink excitation signals sent by the network devices and the relay devices carry different waveform sequence numbers. Downlink excitation signals that carry different waveform sequence numbers are orthogonal, so that uplink reflection signals fed back by different tag devices are orthogonal.

For example, a network device sends indication information to each relay device. The indication information indicates each relay device to send a downlink excitation signal to a tag device, and further indicates a waveform sequence number allocated by the network device to each relay device. A waveform sequence number may be expressed as m, m=1, ..., N. When receiving the indication information, a relay device generates an LFM signal based on the indicated waveform sequence number. The LFM signal may be expressed as follows:

$$x_0(n) = e^{j*\beta*n*\Delta U^2} * e^{-j*\frac{2\pi}{N}*m*n} * e^{j*\beta*m^2*\Delta T^2}, n = 0, 1, \ldots, N-1$$

Figure 10:
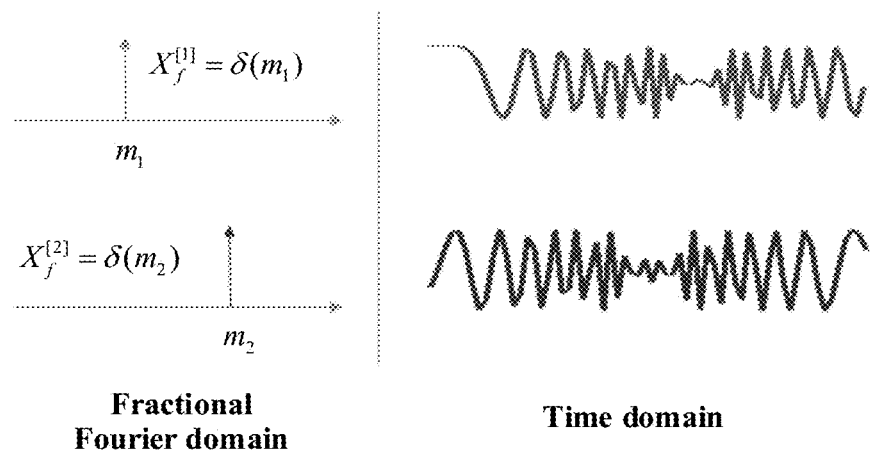
FIG. 10 is a schematic diagram of two linear frequency modulated signals that are orthogonal.

$\beta=0.5 \cot \alpha$, and downlink excitation signals corresponding to different LFM signals are orthogonal. Refer to two orthogonal LFM signals shown in FIG. 10.

Waveform sequence numbers corresponding to two orthogonal LFM signals are $m_1$ and $m_2$, and a corresponding mathematical expression in fractional Fourier domain is as follows:

$$X_f^{[1]} = \delta(m_1) X_f^{[2]} = \delta(m_2)$$

δ(m) represents an impulse function. It indicates that a value at a point m is 1, and values at other points are 0.

$X_f^{[1]}$ and $X_f^{[2]}$ are transformed to a time domain, and the following may be separately obtained (it is assumed that a case corresponding to sin α>0 is similar to a case corresponding to sin α<0):

$$X_f^{[1]}(k) =$$

$$X_f^{[2]}(k) = \sqrt{\frac{\sin\alpha - j\cos\alpha}{N}} * e^{\frac{j}{2}*k^2*\Delta U^2*\cot\alpha} * \sum_{m=1}^{N} \delta(m_1) * e^{-j*\frac{2*\pi*m*k}{N}} * e^{\frac{j}{2}*m^2*\Delta T^2*\cot\alpha}$$

$$\sqrt{\frac{\sin\alpha - j\cos\alpha}{N}} * e^{\frac{j}{2}*k^2*\Delta U^2*\cot\alpha} * \sum_{m=1}^{N} \delta(m_2) * e^{-j*\frac{2*\pi*m*k}{N}} * e^{\frac{j}{2}*m^2*\Delta T^2*\cot\alpha}$$

Different relay devices send orthogonal LFM signals at the same time, and different tag devices send uplink reflection signals to a network device by using the orthogonal LFM signals sent by the different relay devices. When receiving the uplink reflection signals sent by the different tag devices, the network device transforms the plurality of uplink reflection signals to a fractional Fourier domain. Uplink reflection signal corresponding to different LFM signals does not interfere with each other in fractional Fourier domain. In this case, the network device may demodulate and eliminate uplink reflection signals sent by different tag devices by using a filtering technology, to obtain information sent by the different tag devices.

Downlink excitation signals sent by different network devices are orthogonal. For details, refer to that downlink excitation signals sent by different relay devices are orthogonal. Downlink excitation signals sent by a network device and a relay device are orthogonal. For details, refer to that downlink excitation signals sent by different relay devices are orthogonal.

LFM signals with different waveform sequence numbers are orthogonal, and multi-carrier LFM signals with different waveform sequence numbers are also orthogonal. When receiving indication information, a relay device generates a multi-carrier LFM signal based on an indicated waveform sequence number. The multi-carrier LFM signal may be expressed as follows:

$$x_m(n) = \sum_{k=1}^{K} e^{j*2\pi*n*\Delta F*\Delta T} * e^{j*\beta*n*\Delta U^2} * e^{-j*\frac{2\pi}{N}*m*n} * e^{j*\beta*m^2*\Delta T^2}$$

When receiving the uplink reflection signals sent by the different tag devices, the network device transforms the plurality of uplink reflection signals to a fractional Fourier domain. Uplink reflection signal corresponding to different multi-carrier LFM signals does not interfere with each other in the fractional Fourier domain.

In Embodiment 1 to Embodiment 4, that the downlink excitation signal is the LFM signal is used as an example. If the downlink excitation signal is a multi-carrier LFM signal, a time length of one multi-carrier LFM signal is T, and a time length occupied by a modulation symbol of the multi-carrier LFM signal is n*T, n=1, 2, .... Further, a time length occupied by a modulation symbol of an uplink reflection signal is n*T, n=1, 2, ..., that is, a time length occupied by n multi-carrier LFM signals.

The foregoing describes the methods provided in this application from a perspective of interaction between the tag device and the network device. To implement functions in the foregoing methods provided in this application, the tag device and the network device may include a hardware structure and a software module, to implement the foregoing functions in a form of the hardware structure, the software module, or a combination of the hardware structure and the software module. A function in the foregoing functions may be performed in a form of a hardware structure, a software module, or a combination of a hardware structure and a software module.

Figure 11:
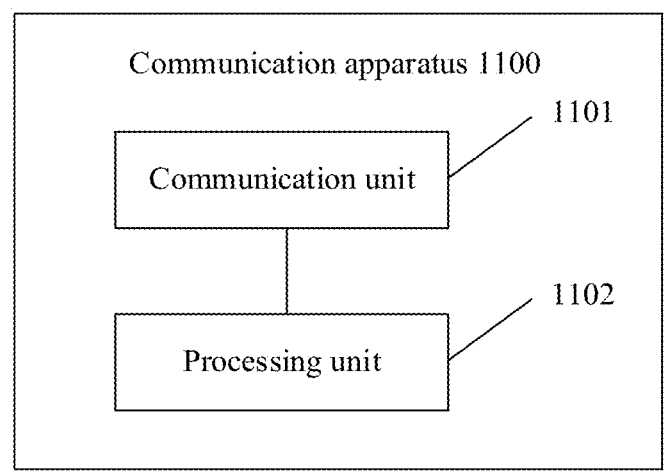
FIG. 11 is a schematic diagram of a structure of a communication apparatus according to this application.

FIG. 11 is a schematic diagram of a structure of a communication apparatus according to an embodiment of this application. The communication apparatus 1100 shown in FIG. 11 may include a communication unit 1101 and a processing unit 1102. The communication unit 1101 may include a sending unit and a receiving unit. The sending unit is configured to implement a sending function, the receiving unit is configured to implement a receiving function, and the communication unit 1101 may implement a sending function and/or a receiving function. The communication unit may also be described as a transceiver unit.

In a possible design, the communication apparatus 1100 may be a tag device, or may be an apparatus in a tag device.

The communication unit 1101 is configured to receive a downlink excitation signal. The downlink excitation signal is a linear frequency modulated signal or a multi-carrier linear frequency modulated signal.

The processing unit 1102 is configured to generate an uplink reflection signal according to the downlink excitation signal and uplink information.

The communication unit 1101 is further configured to send the uplink reflection signal to a network device.

For example, the communication unit 1101 is configured to implement step 701 and step 703 in the embodiment shown in FIG. 7, and the processing unit is configured to implement step 702 in the embodiment shown in FIG. 7.

In a possible design, the communication apparatus 1100 may be a network device, or may be an apparatus in a network device.

The communication unit 1101 is configured to receive an uplink reflection signal from a tag device, and receive a downlink excitation signal. The downlink excitation signal is a linear frequency modulated signal or a multi-carrier linear frequency modulated signal.

The processing unit 1102 is configured to: perform fractional Fourier transform on the uplink reflection signal and the downlink excitation signal, to obtain an uplink frequency domain reflection signal and a downlink frequency domain excitation signal, where the uplink frequency domain reflection signal and the downlink frequency domain excitation signal do not overlap each other; and filter out the downlink frequency domain excitation signal, and transform the uplink frequency domain reflection signal to a time domain, to obtain the uplink reflection signal.

For example, the communication unit 1101 is configured to implement step 703 in the embodiment shown in FIG. 7, and the processing unit is configured to implement step 704 and step 705 in the embodiment shown in FIG. 7.

It can be learned that, because the downlink excitation signal is the linear frequency modulated signal or the multi-carrier linear frequency modulated signal, the uplink reflection signal and the downlink excitation signal do not overlap each other in frequency domain, so that the network device can obtain the uplink reflection signal and obtain the uplink information. This can reduce a probability of missing detecting a tag device by a network device.

Figure 12:
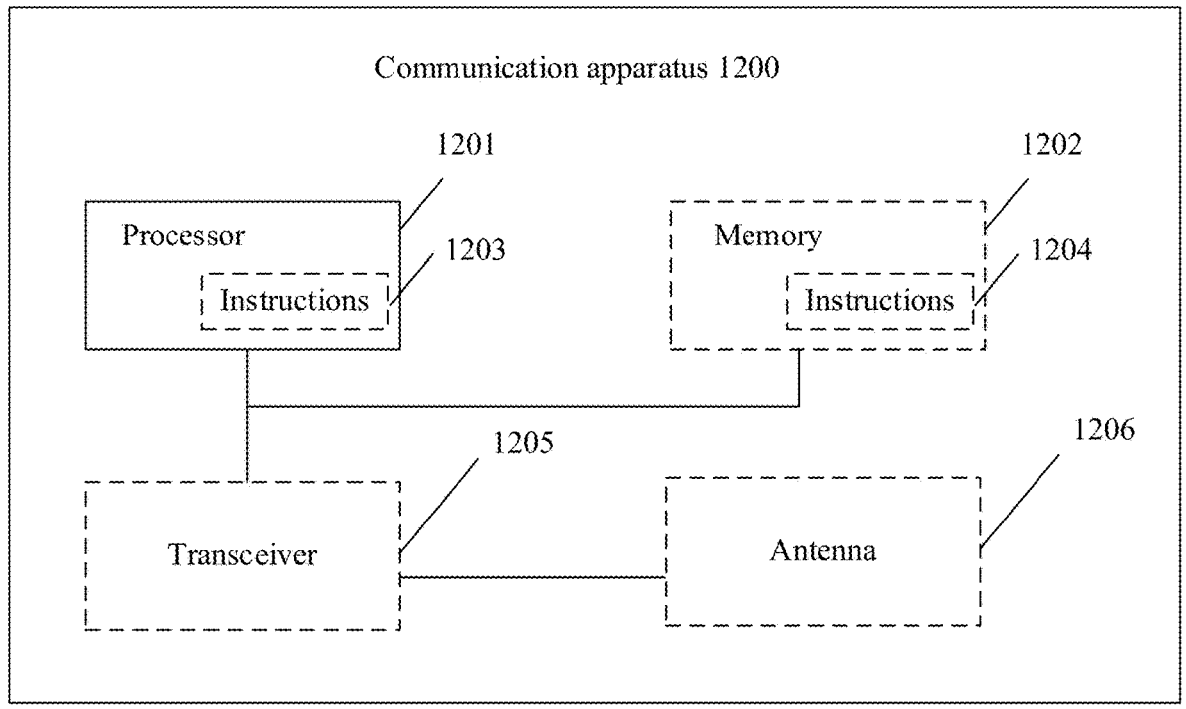
FIG. 12 is a schematic diagram of a structure of another communication apparatus according to this application.

Refer to FIG. 12. FIG. 12 is a schematic diagram of a structure of another communication apparatus according to an embodiment of this application. The communication apparatus 1200 may be a tag device, or may be a chip, a chip system, a processor, or the like that supports a tag device in implementing the foregoing methods. Alternatively, the communication apparatus 1200 may be a network device, or may be a chip, a chip system, a processor, or the like that supports a network device in implementing the foregoing methods. The communication apparatus may be configured to implement the methods described in the foregoing method embodiments. For details, refer to the descriptions in the foregoing method embodiments.

The communication apparatus 1200 may include one or more processors 1201. The processor 1201 may be a general-purpose processor, a dedicated processor, or the like. The processor 1201 may be configured to control the communication apparatus (for example, a tag device, a chip in a tag device, a network device, or a chip in a network device), execute a software program, and process data of the software program.

Optionally, the communication apparatus 1200 may include one or more memories 1202. The memory 1202 may store instructions 1204. The instructions may be run on the processor 1201, to enable the communication apparatus 1200 to perform the methods described in the foregoing method embodiments. Optionally, the memory 1202 may further store data. The processor 1201 and the memory 1202 may be separately disposed, or may be integrated together.

Optionally, the communication apparatus 1200 may further include a transceiver 1205 and/or an antenna 1206. The transceiver 1205 may be referred to as a transceiver unit, a transceiver machine, a transceiver circuit, a transceiver apparatus, a transceiver module, or the like, and is configured to implement a sending/receiving function.

In another possible design, optionally, the processor 1201 may store instructions 1203. When the instructions 1203 are executed on the processor 1201, the communication apparatus 1200 is enabled to perform the methods described in the foregoing method embodiments. The instructions 1203 may be built into the processor 1201. In this case, the processor 1201 may be implemented by hardware.

When the communication apparatus 1200 is a tag device, the transceiver 1205 is configured to perform step 701 and step 703 in the embodiment shown in FIG. 7. The processor 1201 is configured to perform step 702 in the embodiment shown in FIG. 7.

When the communication apparatus 1200 is a network device, the transceiver 1205 is configured to perform step 703 in the embodiment shown in FIG. 7, and receive a downlink excitation signal from a relay device or another network device; and the processor 1201 is configured to perform step 704 and step 705 in the embodiment shown in FIG. 7.

It can be learned that, because the downlink excitation signal is the linear frequency modulated signal or the multi-carrier linear frequency modulated signal, the uplink reflection signal and the downlink excitation signal do not overlap each other in frequency domain, so that the network device can obtain the uplink reflection signal and obtain the uplink information. This can reduce a probability of missing detecting a tag device by a network device.

The processor and the transceiver described in this application may be implemented on an integrated circuit (integrated circuit, IC). The IC may include an analog IC, a radio frequency integrated circuit RFIC, a mixed-signal IC, an application-specific integrated circuit (application specific integrated circuit, ASIC), and the like. A printed circuit on a printed circuit board (printed circuit board, PCB) may implement an IC.

The communication apparatus in the foregoing embodiment may be a network device or a terminal device. However, a scope of the apparatus described in this application is not limited thereto, and a structure of the communication apparatus may not be limited by FIG. 12. The communication apparatus may be:

(1) an independent integrated circuit IC, a chip, a chip system, or a subsystem of a chip system; or
(2) a receiver, a terminal, a cellular phone, a wireless device, a handset, a mobile unit, a vehicle-mounted device, a network device, a cloud device, an artificial intelligence device, a machine device, a home device, a medical device, an industrial device, or the like.

Figure 13:
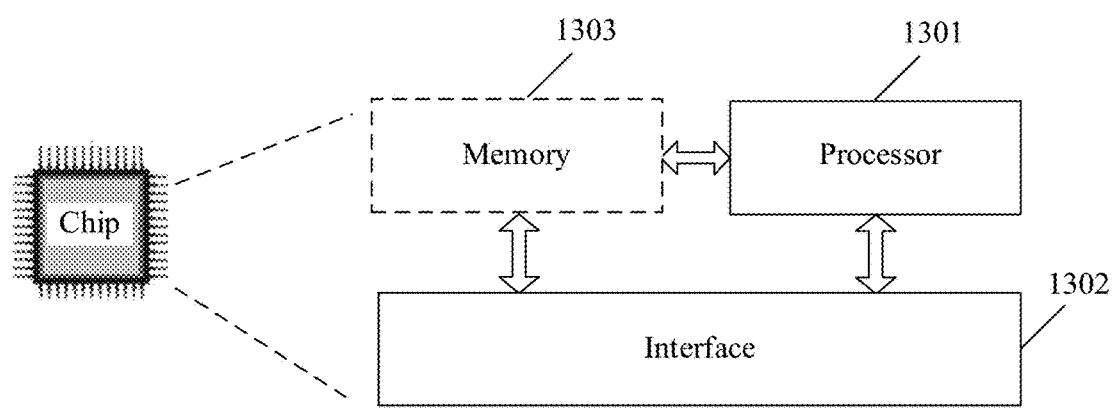
FIG. 13 is a schematic diagram of a structure of a chip according to this application.

For a case in which the communication apparatus may be a chip or a chip system, refer to a schematic diagram of a structure of a chip shown in FIG. 13. The chip 1300 shown in FIG. 13 includes a processor 1301 and an interface 1302. There may be one or more processors 1301, and there may be a plurality of interfaces 1302.

In a case in which the chip is configured to implement the functions of the tag device in embodiments of this application:

The interface 1302 is configured to receive a downlink excitation signal. The downlink excitation signal is a linear frequency modulated signal or a multi-carrier linear frequency modulated signal.

The processor 1301 is configured to generate an uplink reflection signal according to the downlink excitation signal and uplink information.

The interface 1302 is further configured to output the uplink reflection signal.

Optionally, the processor 1301 is specifically configured to modulate the uplink information by using a modulation scheme to obtain an uplink modulated signal; and the tag device generates the uplink reflection signal according to the downlink excitation signal and the uplink modulated signal.

The modulation scheme is a binary on-off keying OOK modulation scheme, a quadrature phase shift keying QPSK modulation scheme, a hexadecimal quadrature amplitude modulation 16QAM scheme, or another high-order modulation scheme.

Optionally, when the modulation scheme is the OOK modulation scheme, that the uplink reflection signal carries a square wave signal with a variable frequency indicates an On state, or that the uplink reflection signal has no reflected signal indicates an Off state.

Optionally, the uplink reflection signal is delayed for a specific time period relative to the downlink excitation signal.

Optionally, the processor 1301 is specifically configured to: generate a downlink excitation synchronization signal according to the downlink excitation signal and a synchronization sequence; and generate the uplink reflection signal according to the downlink excitation synchronization signal and the uplink information.

Optionally, when the downlink excitation signal comes from the network device, the downlink excitation signal carries a waveform sequence number corresponding to the network device.

Optionally, when the downlink excitation signal comes from a relay device, the downlink excitation signal carries a waveform sequence number allocated by the network device to the relay device.

Optionally, downlink excitation signals corresponding to different waveform sequence numbers are orthogonal.

In a case in which the chip is configured to implement the functions of the network device in embodiments of this application:

The interface 1302 is configured to receive an uplink reflection signal from a tag device, and receive a downlink excitation signal. The downlink excitation signal is a linear frequency modulated signal or a multi-carrier linear frequency modulated signal.

The processor 1301 is configured to: perform fractional Fourier transform on the uplink reflection signal and the downlink excitation signal, to obtain an uplink frequency domain reflection signal and a downlink frequency domain excitation signal, where the uplink frequency domain reflection signal and the downlink frequency domain excitation signal do not overlap each other; and filter out the downlink frequency domain excitation signal, and transform the uplink frequency domain reflection signal to a time domain, to obtain the uplink reflection signal.

Optionally, the downlink excitation signal comes from another network device, and the downlink excitation signal carries a waveform sequence number corresponding to the another network device.

Optionally, the downlink excitation signal comes from a relay device, and the downlink excitation signal carries a waveform sequence number allocated by the network device to the relay device.

Optionally, the interface 1302 is further configured to output indication information. The indication information indicates a waveform sequence number allocated by the network device to the relay device.

Optionally, the interface 1302 is further configured to send downlink information to the tag device by using a downlink carrier signal. The downlink carrier signal is a linear frequency modulated signal or a multi-carrier linear frequency modulated signal.

It can be learned that, because the downlink excitation signal is the linear frequency modulated signal or the multi-carrier linear frequency modulated signal, the uplink reflection signal and the downlink excitation signal do not overlap each other in frequency domain, so that the network device can obtain the uplink reflection signal and obtain the uplink information. This can reduce a probability of missing detecting a tag device by a network device.

A person skilled in the art may further understand that various illustrative logical blocks (illustrative logical block) and steps (step) that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the protection scope of embodiments of this application.

This application further provides a computer-readable storage medium. The computer-readable storage medium stores a computer program. When the computer-readable storage medium is executed by a computer, the functions in any one of the foregoing method embodiments are implemented.

This application further provides a computer program product. When the computer program product is executed by a computer, the functions in any one of the foregoing method embodiments are implemented.

All or a part of the foregoing embodiments may be implemented by software, hardware, firmware, or any combination thereof. When the software is used to implement embodiments, all or a part of embodiments may be implemented in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state disk (solid state disk, SSD)), or the like.

A person of ordinary skill in the art may understand that various numbers such as "first" and "second" in this application are merely used for differentiation for ease of description, and are not used to limit the scope of embodiments of this application or represent a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, appropriate deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "build into", or "pre-burn".

A person of ordinary skill in the art may be aware that, in combination with algorithms and steps in the examples described in embodiments in this specification, this application can be implemented by hardware or a combination of hardware and computer software. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, wherein the apparatus comprises:
at least one processor; and
one or more memories coupled to the at least one processor and storing programming instructions for execution by the at least one processor to:
receive a downlink excitation signal from a relay device that is not a tag device, wherein the downlink excitation signal is a linear frequency modulated signal or a multi-carrier linear frequency modulated signal, and wherein the downlink excitation signal carries a sequence number allocated by a network device to the relay device;
generate an uplink reflection signal according to the downlink excitation signal and uplink information; and
send the uplink reflection signal to the network device.

2. The apparatus according to claim 1, wherein the programming instructions are for execution by the at least one processor to:
modulate the uplink information by using a modulation scheme to obtain an uplink modulated signal; wherein the uplink reflection signal is generated according to the downlink excitation signal and the uplink modulated signal, wherein:
the modulation scheme is a binary on-off keying (OOK) modulation scheme, a quadrature phase shift keying (QPSK) modulation scheme, a hexadecimal quadrature amplitude modulation (16QAM) scheme, or another high-order modulation scheme.

3. The apparatus according to claim 2, wherein when the modulation scheme is the OOK modulation scheme, the uplink reflection signal carrying a square wave signal with a variable frequency indicates an On state, or the uplink reflection signal having no reflected signal indicates an Off state.

4. The apparatus according to claim 2, wherein the uplink reflection signal is delayed for a specific time period relative to the downlink excitation signal.

5. The apparatus according to claim 1, wherein the programming instructions are for execution by the at least one processor to:
generate a downlink excitation synchronization signal according to the downlink excitation signal and a synchronization sequence; and
generate the uplink reflection signal according to the downlink excitation synchronization signal and the uplink information.

6. An apparatus, wherein the apparatus comprises:
at least one processor; and
one or more memories coupled to the at least one processor and storing programming instructions for execution by the at least one processor to:
receive an uplink reflection signal from a tag device;
receive a downlink excitation signal from a relay device or a network device that is not another tag device, wherein the downlink excitation signal is a linear frequency modulated signal or a multi-carrier linear frequency modulated signal;
perform fractional Fourier transform on the uplink reflection signal and the downlink excitation signal, to obtain an uplink frequency domain reflection signal and a downlink frequency domain excitation signal, wherein the uplink frequency domain reflection signal and the downlink frequency domain excitation signal do not overlap each other;
filter out the downlink frequency domain excitation signal; and
transform the uplink frequency domain reflection signal to a time domain to obtain the uplink reflection signal.

7. The apparatus according to claim 6, wherein the downlink excitation signal carries a waveform sequence number corresponding to the network device.

8. The apparatus according to claim 6, wherein the downlink excitation signal carries a waveform sequence number allocated by the network device to the relay device.

9. The apparatus according to claim 8, wherein the programming instructions are for execution by the at least one processor to:
send indication information to the relay device, wherein the indication information indicates the waveform sequence number allocated by the network device to the relay device.

10. The apparatus according to claim 6, wherein the programming instructions are for execution by the at least one processor to:
send downlink information to the tag device by using a downlink carrier signal, wherein the downlink carrier signal is a linear frequency modulated signal or a multi-carrier linear frequency modulated signal.

11. A method, comprising:
receiving, by a tag device from a relay device that is not another tag device, a downlink excitation signal, wherein the downlink excitation signal is a linear frequency modulated signal or a multi-carrier linear frequency modulated signal, and wherein the downlink excitation signal carries a sequence number allocated by a network device to the relay device;
generating, by the tag device, an uplink reflection signal according to the downlink excitation signal and uplink information; and
sending, by the tag device, the uplink reflection signal to the network device.

12. The method according to claim 11, wherein the generating, by the tag device, an uplink reflection signal according to the downlink excitation signal and uplink information comprises:
modulating, by the tag device, the uplink information by using a modulation scheme to obtain an uplink modulated signal; and
generating, by the tag device, the uplink reflection signal according to the downlink excitation signal and the uplink modulated signal, wherein:
the modulation scheme is a binary on-off keying (OOK) modulation scheme, a quadrature phase shift keying (QPSK) modulation scheme, a hexadecimal quadrature amplitude modulation (16QAM) scheme, or another high-order modulation scheme.

13. The method according to claim 12, wherein when the modulation scheme is the OOK modulation scheme, the uplink reflection signal carrying a square wave signal with a variable frequency indicates an On state, or the uplink reflection signal having no reflected signal indicates an Off state.

14. The method according to claim 12, wherein the uplink reflection signal is delayed for a specific time period relative to the downlink excitation signal.

15. The method according to claim 11, wherein the generating, by the tag device, an uplink reflection signal according to the downlink excitation signal and uplink information comprises:
  generating, by the tag device, a downlink excitation synchronization signal according to the downlink excitation signal and a synchronization sequence; and
  generating, by the tag device, the uplink reflection signal according to the downlink excitation synchronization signal and the uplink information.

16. The apparatus according to claim 1, wherein the downlink excitation signal is a linear frequency modulation (LFM) signal or a multi-carrier LFM signal.

17. The apparatus according to claim 5, wherein the downlink excitation synchronization signal comprises a repetition of a downlink excitation synchronization signal unit, and wherein a quantity of repetitions of the downlink excitation synchronization signal unit is related to a time length of the uplink reflection signal.

18. The apparatus according to claim 6, wherein the downlink excitation signal is a linear frequency modulation (LFM) signal or a multi-carrier LFM signal.

19. The method according to claim 11, wherein the downlink excitation signal is a linear frequency modulation (LFM) signal or a multi-carrier LFM signal.

20. The method according to claim 15, wherein the downlink excitation synchronization signal comprises a repetition of a downlink excitation synchronization signal unit, and wherein a quantity of repetitions of the downlink excitation synchronization signal unit is related to a time length of the uplink reflection signal.

\* \* \* \* \*